United States Patent
Kayukawa et al.

(10) Patent No.: US 7,019,472 B2
(45) Date of Patent: Mar. 28, 2006

(54) VEHICLE CONTROLLER THAT STABLY SUPPLIES POWER TO A BATTERY AND METHOD THEREOF

(75) Inventors: Atsushi Kayukawa, Anjo (JP); Yoshitaka Murase, Anjo (JP); Yoichi Tajima, Anjo (JP); Yukinori Nakamori, Anjo (JP); Yasuhiko Kobayashi, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 65 days.

(21) Appl. No.: 10/653,189

(22) Filed: Sep. 3, 2003

(65) Prior Publication Data

US 2004/0070353 A1    Apr. 15, 2004

(30) Foreign Application Priority Data

Oct. 9, 2002    (JP) ............................... 2002-296801

(51) Int. Cl.
*H02P 1/00*    (2006.01)

(52) U.S. Cl. ........................ 318/139; 318/376; 318/377

(58) Field of Classification Search ................ 318/139, 318/376, 377, 500; 320/132; 180/65.2; 388/928.1
See application file for complete search history.

(56) References Cited

U.S. PATENT DOCUMENTS 6,104,166 A * 8/2000 Kikuchi et al. ............. 320/132
6,366,059 B1 * 4/2002 Wakashiro et al. ........... 322/16
6,540,035 B1 * 4/2003 Nagano et al. ............ 180/65.2

FOREIGN PATENT DOCUMENTS

JP    A 5-168105    7/1993
JP    A 9-215270    8/1997

* cited by examiner

*Primary Examiner*—Karen Masih
(74) *Attorney, Agent, or Firm*—Oliff & Berridge, PLC

(57) ABSTRACT

A vehicle and method of operating a vehicle including a motor that supplies a driving force to a wheel, a battery that supplies electric power to the motor and receives regenerative electric power from the motor and a controller that detects a state of the battery and sets, based on a detected state of the battery, a first upper limit value and a first lower limit value for a voltage value and an electric current value that is output from the battery to the motor, and a second upper limit value and second lower limit value for the voltage value and the electric current value that is input from the regenerative electric power to the battery.

13 Claims, 17 Drawing Sheets

MAP A
|  | STARTING CONTROL | | | |
|---|---|---|---|---|
|  | HIGH OUTSIDE AIR TEMPERATURE | | LOW OUTSIDE AIR TEMPERATURE | |
|  | HIGH SOH | LOW SOH | HIGH SOH | LOW SOH |
| VOLTAGE (HIGH SIDE) | 57V | 57V | 57V | 57V |
| VOLTAGE (LOW SIDE) | 30V | 35V | 35V | 40V |
| ELECTRIC CURRENT (POSITIVE SIDE) | 500A | 450A | 450A | 400A |
| ELECTRIC CURRENT (NEGATIVE SIDE) | −500A | −450A | −450A | −400A |
Fig. 10A
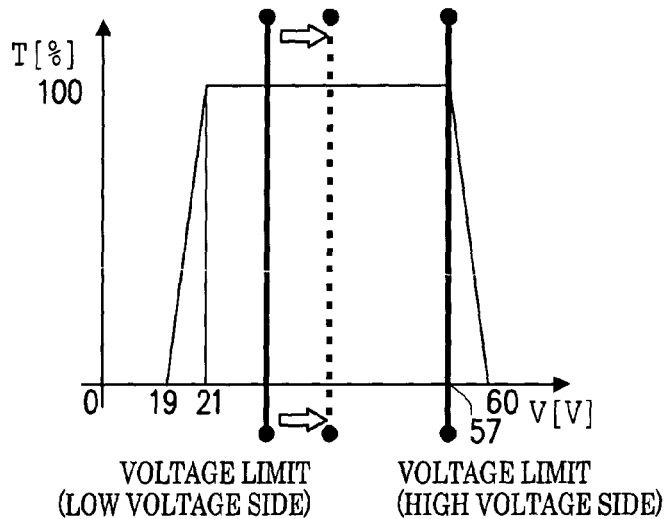
Fig. 10B
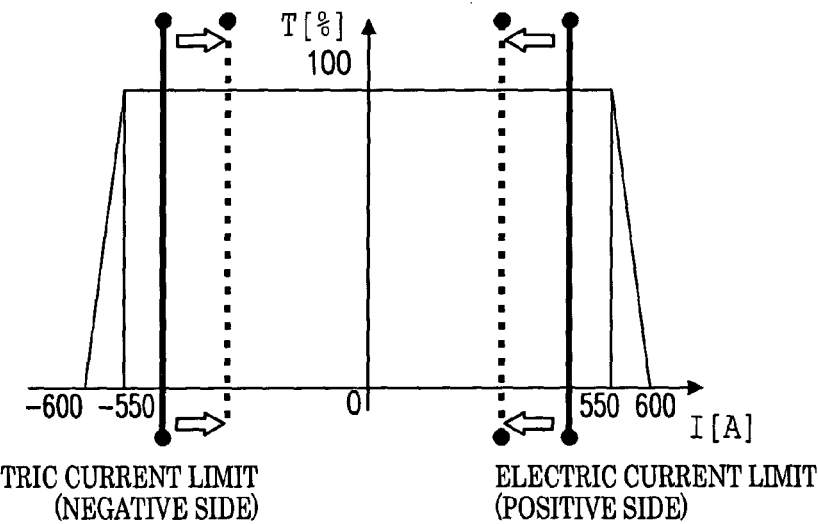
Fig. 10C MAP B
| | STOPPAGE CONTROL | | | |
|---|---|---|---|---|
| | HIGH OUTSIDE AIR TEMPERATURE | | LOW OUTSIDE AIR TEMPERATURE | |
| | HIGH SOH | LOW SOH | HIGH SOH | LOW SOH |
| VOLTAGE (HIGH SIDE) | 54V | 50V | 50V | 46V |
| VOLTAGE (LOW SIDE) | 28V | 32V | 32V | 37V |
| ELECTRIC CURRENT (POSITIVE SIDE) | 500A | 450A | 450A | 400A |
| ELECTRIC CURRENT (NEGATIVE SIDE) | −500A | −450A | −450A | −400A |
Fig. 11A
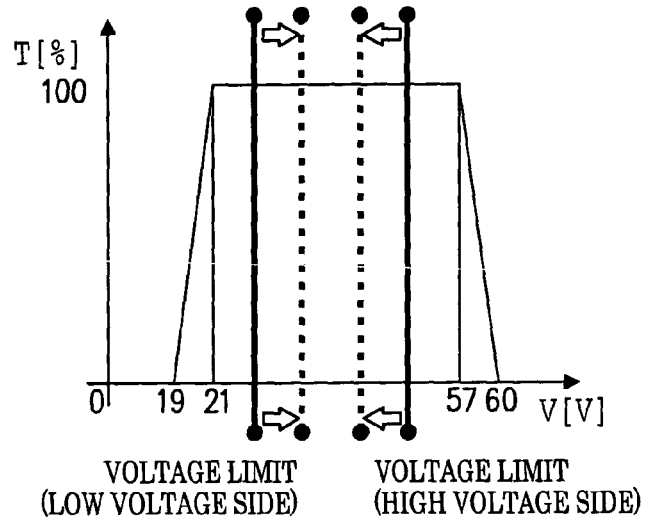
Fig. 11B
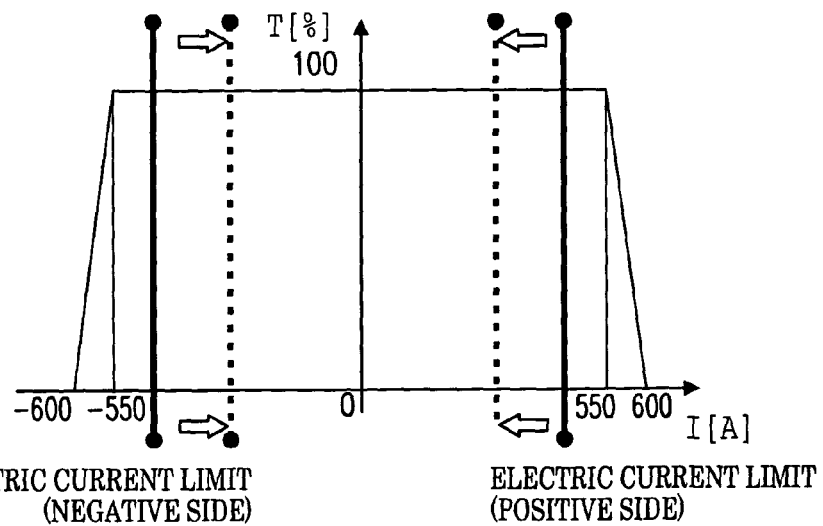
Fig. 11C

| MAP C | CHARGING CONTROL | | | |
|---|---|---|---|---|
| | HIGH OUTSIDE AIR TEMPERATURE | | LOW OUTSIDE AIR TEMPERATURE | |
| | HIGH SOH | LOW SOH | HIGH SOH | LOW SOH |
| VOLTAGE (HIGH SIDE) | 56V | 54V | 54V | 52V |
| VOLTAGE (LOW SIDE) | 21V | 21V | 21V | 21V |
| ELECTRIC CURRENT (POSITIVE SIDE) | 540A | 520A | 520A | 500A |
| ELECTRIC CURRENT (NEGATIVE SIDE) | 0A | 0A | 0A | 0A |
Fig. 12A
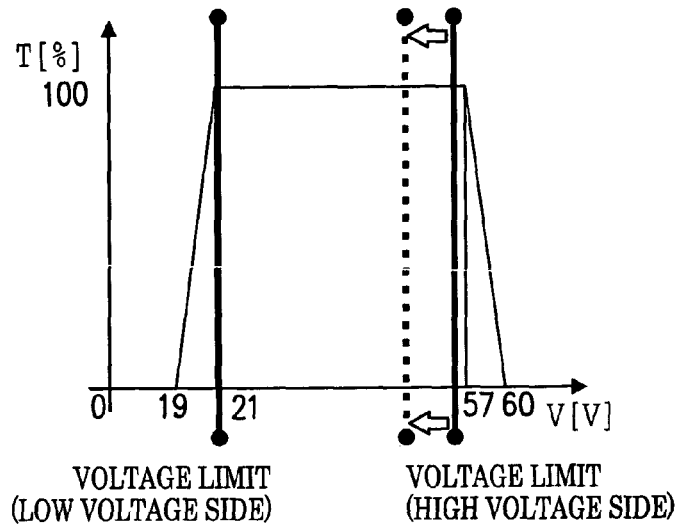
Fig. 12B
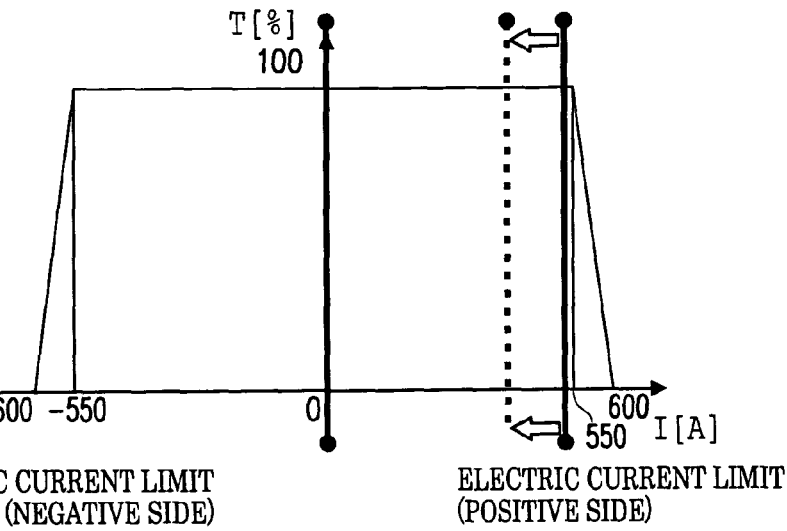
Fig. 12C

| MAP D | ASSIST CONTROL | | | |
|---|---|---|---|---|
| | HIGH OUTSIDE AIR TEMPERATURE | | LOW OUTSIDE AIR TEMPERATURE | |
| | HIGH SOH | LOW SOH | HIGH SOH | LOW SOH |
| VOLTAGE (HIGH SIDE) | 57V | 57V | 57V | 57V |
| VOLTAGE (LOW SIDE) | 30V | 35V | 35V | 40V |
| ELECTRIC CURRENT (POSITIVE SIDE) | 0A | 0A | 0A | 0A |
| ELECTRIC CURRENT (NEGATIVE SIDE) | −500A | −450A | −450A | −400A |
Fig. 13A
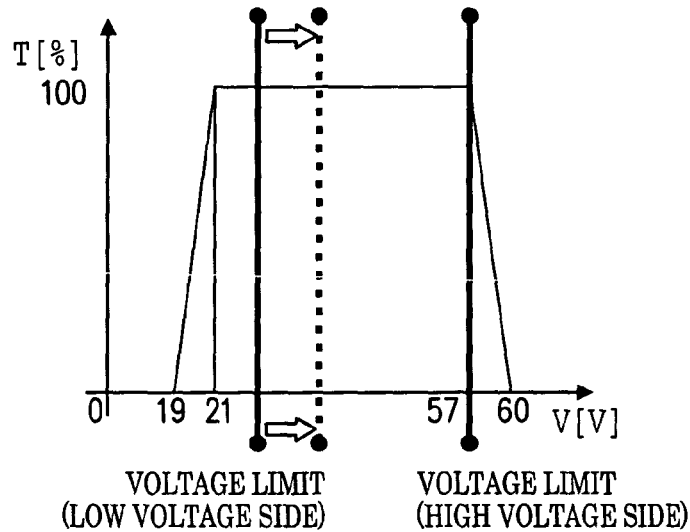
Fig. 13B
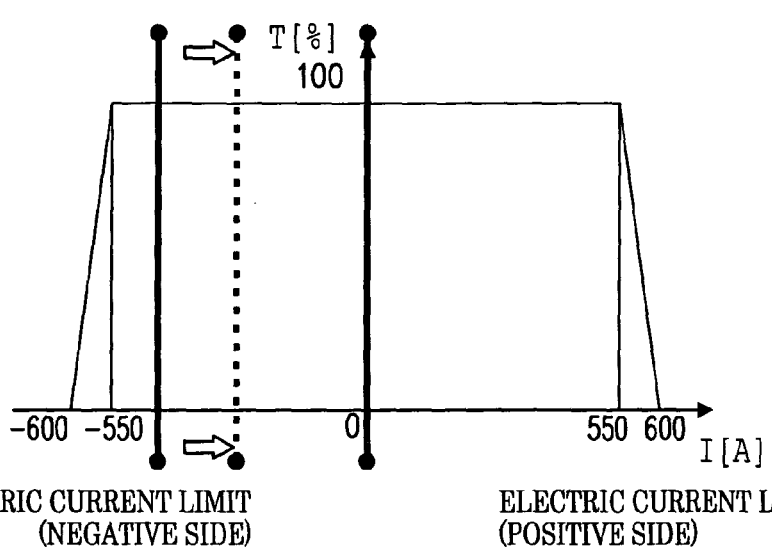
Fig. 13C MAP E
| | REGENERATIVE CONTROL | | | |
| --- | --- | --- | --- | --- |
| | HIGH OUTSIDE AIR TEMPERATURE | | LOW OUTSIDE AIR TEMPERATURE | |
| | HIGH SOH | LOW SOH | HIGH SOH | LOW SOH |
| VOLTAGE (HIGH SIDE) | 54V | 50V | 50V | 46V |
| VOLTAGE (LOW SIDE) | 22V | 22V | 22V | 22V |
| ELECTRIC CURRENT (POSITIVE SIDE) | 520A | 500A | 500A | 480A |
| ELECTRIC CURRENT (NEGATIVE SIDE) | 0A | 0A | 0A | 0A |
Fig. 14A
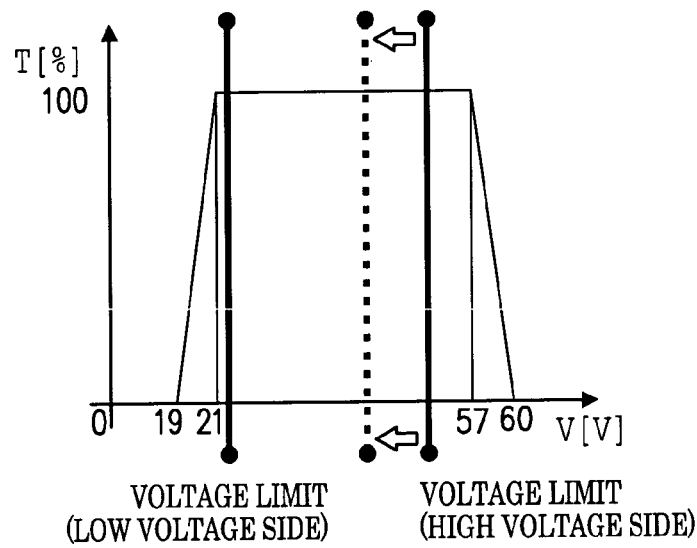
Fig. 14B
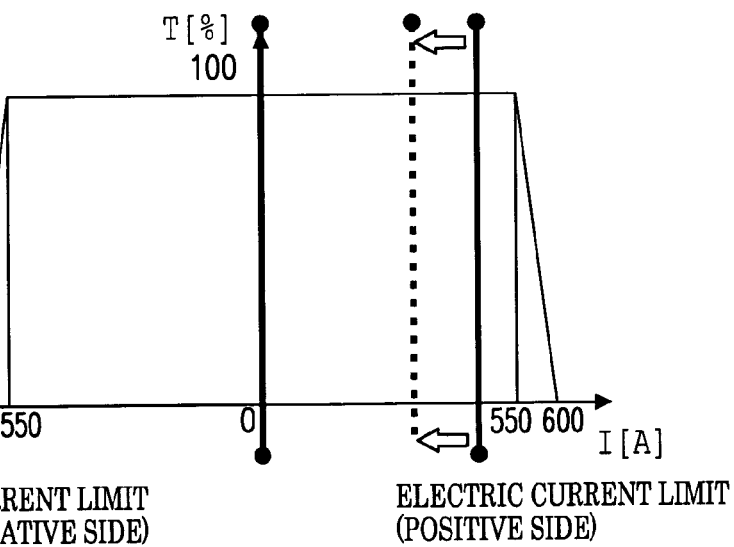
Fig. 14C MAP F
|  | STOPPAGE CONTROL |  |  |  |
|---|---|---|---|---|
|  | HIGH OUTSIDE AIR TEMPERATURE | | LOW OUTSIDE AIR TEMPERATURE | |
|  | HIGH SOH | LOW SOH | HIGH SOH | LOW SOH |
| VOLTAGE (HIGH SIDE) | 57V | 55V | 55V | 52V |
| VOLTAGE (LOW SIDE) | 21V | 24V | 24V | 26V |
| ELECTRIC CURRENT (POSITIVE SIDE) | 550A | 520A | 520A | 500A |
| ELECTRIC CURRENT (NEGATIVE SIDE) | −550A | −520A | −520A | −500A |
Fig. 15A
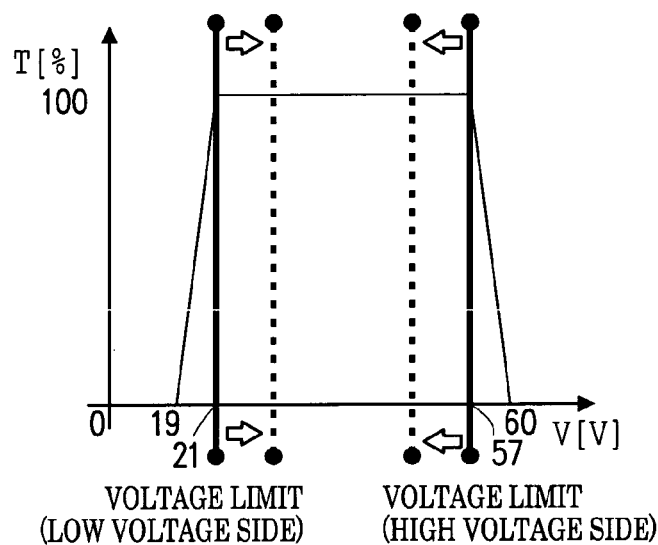
Fig. 15B
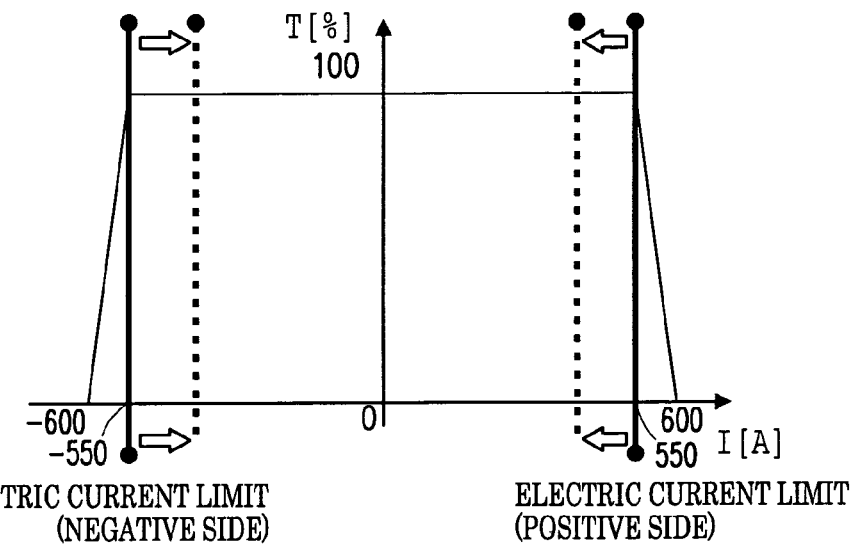
Fig. 15C

VEHICLE CONTROLLER THAT STABLY SUPPLIES POWER TO A BATTERY AND METHOD THEREOF

INCORPORATION BY REFERENCE

The disclosure of Japanese Patent Application No. 2002-296801 filed on Oct. 9, 2002 including the specification, drawings and abstracts are incorporated herein by reference in their entirety.

BACKGROUND OF THE INVENTION

1. Field of Invention

The invention relates to a vehicle with a controller that is able to stably supply electric power and provide a charging function irrespective of a deteriorating state of the battery.

2. Description of Related Art

In recent years, a parallel-hybrid system has been known (for example, see Japanese Patent Application No. JP-A-9-215270). In this parallel-hybrid system, both an engine and a motor-generator are arranged in a speed change gear. At a starting time and an accelerating time, driving forces from both the engine and the motor-generator are transmitted to the speed change gear. Further, at a running time on a slope descending path and at a braking time, an engine brake effect is compensated for by making the motor-generator function as a generator. Further, fuel cost is improved by a regenerating braking energy and the exhaust amount of the exhaust gas is reduced.

Further, a series-hybrid system has been also known (for example, see Japanese Patent Application No. JP-A-5-168105). This series-hybrid system is constructed such that an engine, a motor and an electric generator are arranged in a speed change gear. Also, the electric generator is operated by the engine and the motor is driven by the generated electric power so that the vehicle runs. The engine outputs a low torque amount and is semi-steadily operated in a good efficient area and the vehicle runs while the battery is efficiently charged.

In a device relating to conventional HEV (Hybrid Electric Vehicle) control, particularly, a power source device described in Japanese Patent Application No. JP-A-5-168105, the battery, an inverter, a DC/DC converter, etc. mounted to the vehicle are protected by controlling the value of an electric current of the electric power that is supplied to the motor. In this power source device, when the direct electric current value applied to the DC/DC converter and the electric generator exceeds a predetermined value at the motor starting time, the generation of an overcurrent is restrained and damage of the battery is prevented by adjusting a magnetic field electric current and restraining the direct electric current value.

SUMMARY OF THE INVENTION

However, the above conventional power source device described in JP-A-5-168105 is designed to protect so-called hardware such as the battery and its peripheral devices. For example, this conventional power source device is constructed such that electric current normally flows even when the charging state (hereinafter also called SOC (State Of Charge)) of the battery is reduced. Therefore, when the deteriorating state (hereinafter also called SOH (State Of Health)) of the battery itself is reduced, there is a fear that the hunting of changing a control variable in a wavy shape is caused. In this hunting, even when the electric current is supplied at the same electric current value, voltage is suddenly reduced after the supply and the electric current is excessively flowed. Immediately after this flowing, this excessive electric current is limited by an electric current limit value, and is returned to the normal value. Further, immediately after this returning, the excessive electric current again flows. There is also a fear that preferable driving of the motor is damaged when the overcurrent flows. Accordingly, there is a need to obtain a device that stably drives the motor irrespective of the battery state.

Therefore, the invention thus provides a vehicle with a controller constructed so as to reliably prevent hunting that is possibly generated in the conventional HEV control, and realize stable motor driving irrespective of the battery state by improving the setting of the limit value so that the above problems are solved.

A vehicle, according to an exemplary aspect of the invention, includes a motor that supplies a driving force to a wheel, a battery that supplies electric power to the motor and receives regenerative electric power from the motor and a controller. The controller detects a state of the battery and sets, based on a detected state of the battery, a first upper limit value and a first lower limit value for a voltage value and an electric current value that is output from the battery to the motor, and a second upper limit value and second lower limit value for the voltage value and the electric current value that is input from the regenerative electric power to the battery.

The "motor" in the invention is a concept not limited to a motor of a so-called narrow sense for converting electric energy to a rotational movement, but also including a so-called generator for converting the rotational movement to the electric energy.

Accordingly, the controller detects the state of the battery, and sets the upper and lower limit values for the voltage value and the electric current value at the output time of the electric power for driving, and the voltage value and the electric current value at the input time of the regenerative electric power in accordance with the battery state. Accordingly, for example, when the battery deteriorating state (SOH) of the above battery state is reduced, the upper and lower limits can be also applied with respect to the voltage value together with the electric current value even when the electric current of a value similar to that in the high SOH case is flowed. Therefore, voltage is not suddenly reduced after the supply of the electric current. Accordingly, the phenomenon of excessive flowing of the electric current is reliably avoided, and the generation of hunting is prevented so that stable motor driving can be realized.

For the purposes of this disclosure, device and means maybe considered synonyms. Further, in some cases, as defined in the specification, the device/means may include other elements.

BRIEF DESCRIPTION OF THE DRAWINGS

Various embodiments of the invention will be described with reference to the following figures, in which:

FIGS. 10A–15C are views showing a concrete example of the control using the controller of FIG. 1;

DETAILED DESCRIPTION OF PREFERRED EMBODIMENTS

Figure 1:
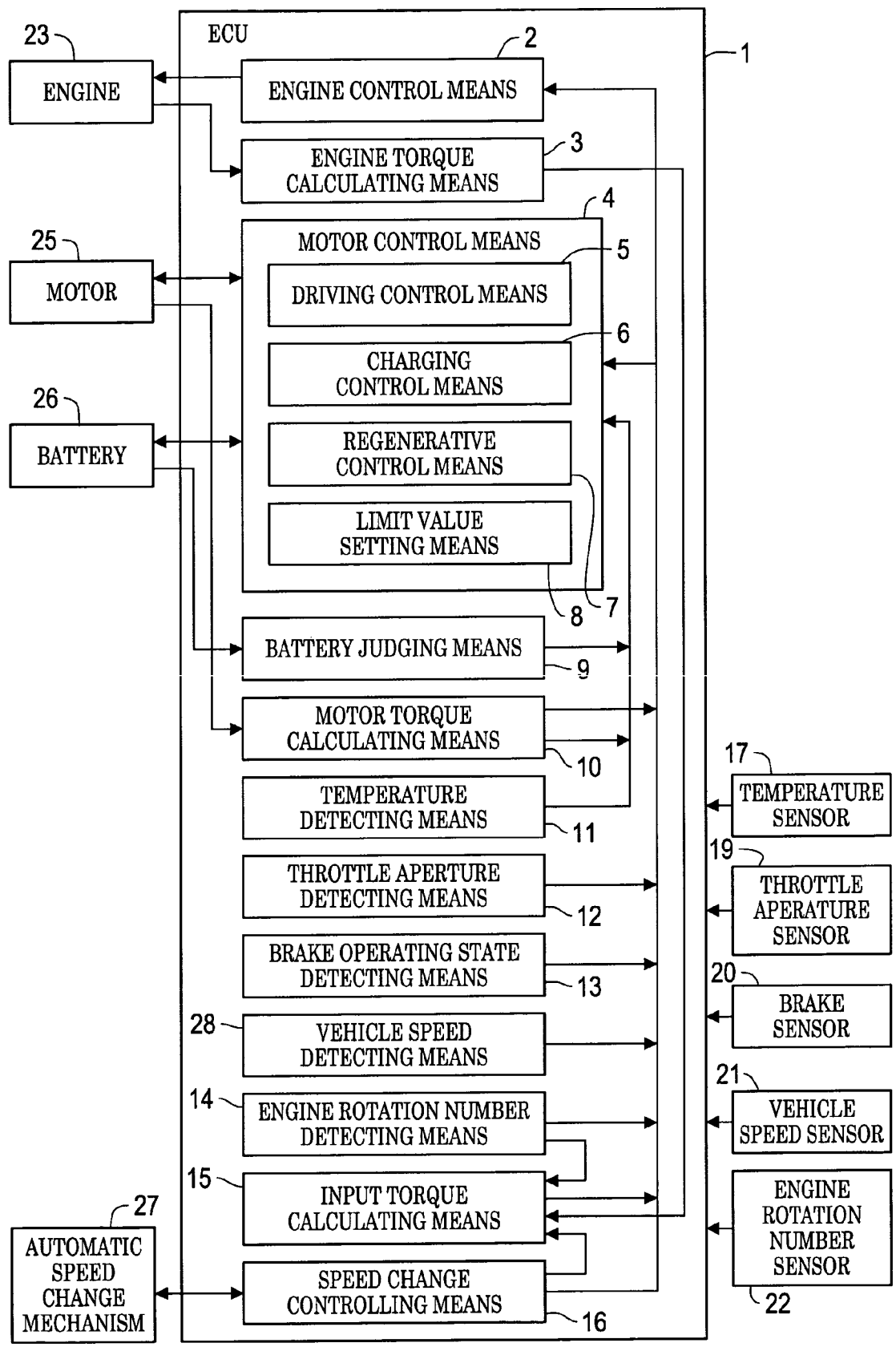
FIG. 1 is a block diagram showing a controller of a vehicle in accordance with an embodiment of the invention.
Figure 2:
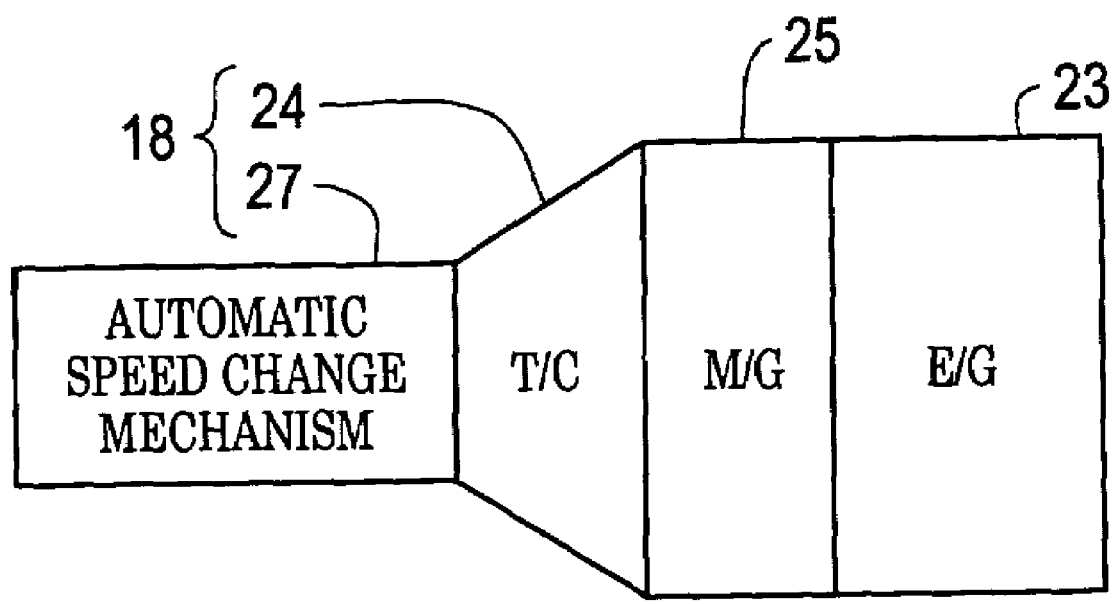
FIG. 2 is a block diagram showing the driving system of a hybrid vehicle controlled by the controller of FIG. 1.
Figure 3:
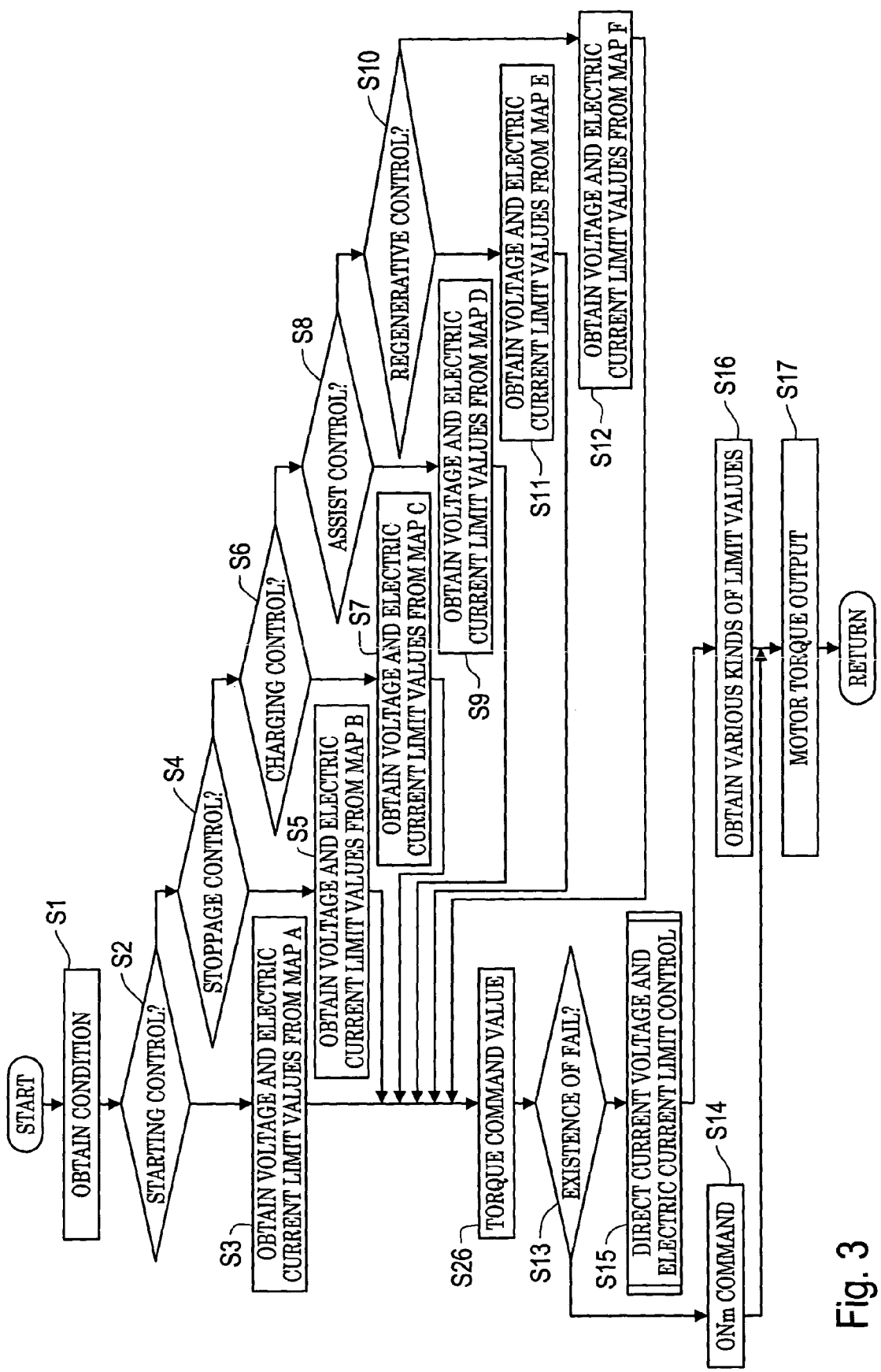
FIGS. 3–9 are flowcharts showing the control using the controller of FIG. 1.
Figure 16:
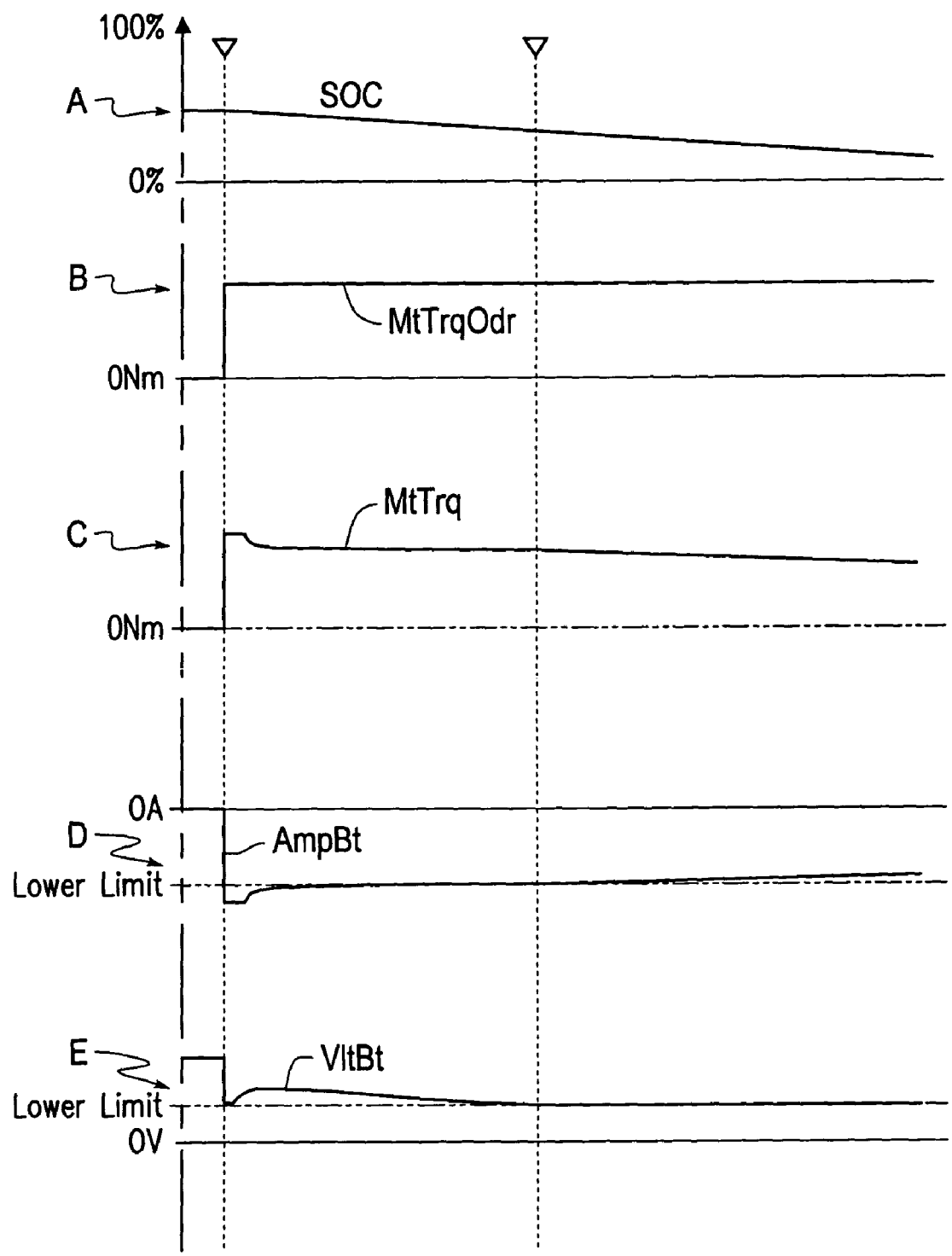
FIG. 16 is a time chart showing one example of motor driving control using the controller of FIG. 1.
Figure 17:
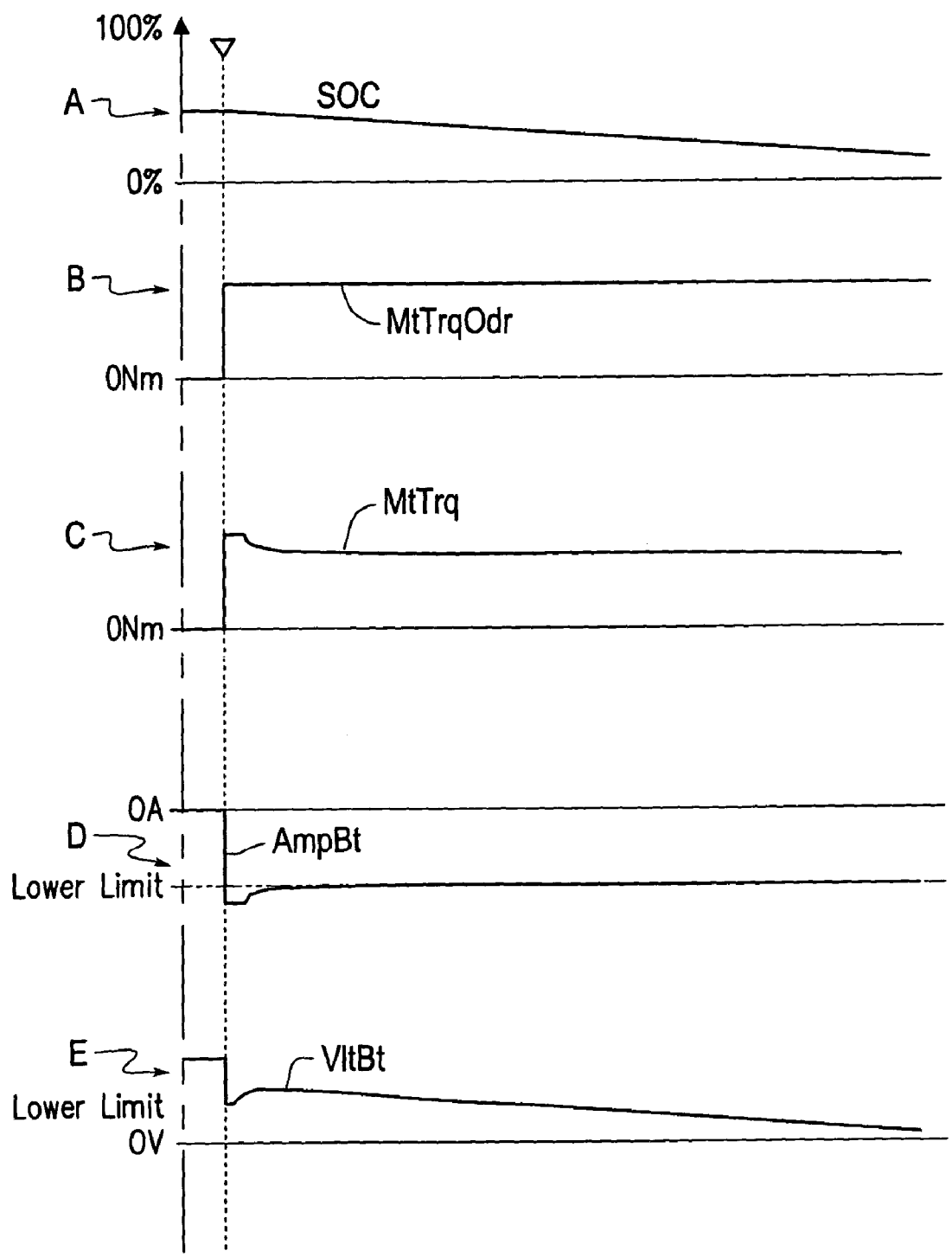
FIG. 17 is a time chart showing one example of the motor driving control of a conventional type.

The embodiment of the invention will next be explained with reference to the drawings. FIG. 1 is a block diagram showing a vehicle controller according to an embodiment of the invention. FIG. 2 is a block diagram showing the driving system of a hybrid vehicle that is controlled by the controller. FIGS. 3 to 9 are flow charts showing the control using the controller. FIGS. 10 to 15 are views showing concrete examples of each control using the controller. FIG. 16 is a time chart showing a control situation using the controller. FIG. 17 is a time chart showing a control situation using the controller of a conventional type. Numerical values shown in FIGS. 10 to 15 are an example in which the parameters of a battery are 36 V and 1872 W/h. As should be appreciated, other parameters can be used.

First, as shown in FIG. 2, a driving source of the hybrid vehicle includes an internal combustion engine (hereinafter also simply called an "engine") 23 and a motor-generator (hereinafter also simply called a "motor") 25, with the driving force outputted to an automatic speed change gear 18. The automatic speed change gear 18 has a torque converter 24 and an automatic speed change mechanism (multistage speed change mechanism) 27 that can transmit the driving forces of the engine 23 and the motor 25 to a power transmission downstream side, and allow the rotation of an unillustrated rotor of the motor 25 in the braking state of a driving wheel on this power transmission downstream side.

The automatic speed change mechanism 27 has unillustrated plural friction coefficient elements for changing speeds. Also, engaging states of the friction coefficient elements are changed by using a speed change control device 16 described later. Thus, the inputted driving force can be outputted to the driving wheel by changing the speeds on the basis of a predetermined vehicle running situation. The "internal combustion engine" in this embodiment is an engine for converting energy to a rotational movement by combusting a fuel and is a concept including a gasoline engine, a diesel engine, etc.

The controller of the vehicle in the invention will next be explained with reference to FIG. 1. As shown in FIG. 1, the controller includes an electronic control unit (ECU) 1 having an engine control means 2, an engine torque calculating means 3, a motor control means 4, a battery judging means 9, a motor torque calculating means 10, a temperature detecting means 11, a throttle aperture detecting means 12, a brake operating state detecting means 13, a vehicle speed detecting means 28, an engine rotation number detecting means 14, an input torque calculating means 15 and a speed change control means 16.

In this embodiment, a battery state detecting means includes the battery judging means 9 and the temperature detecting means 11. However, the battery state detecting means can also include means for detecting other conditions such as the temperature of a motor 25 described later, the temperature of an unillustrated inverter for generating a driving signal for the motor 25 in addition to the battery judging means 9 and the temperature detecting means 11. In this embodiment, the "outside air temperature" is a temperature having an influence on battery performance, and is detected by the temperature detecting means 11 of the above battery state detecting means. However, the temperature is not limited to the outside air temperature, but the "battery temperature" may include any temperature having an influence on the battery performance that is detected by the temperature detecting means 11. In this case, operations and effects similar to those in the case of the detection of the outside air temperature are naturally obtained.

A temperature sensor 17 for detecting the temperature around the battery, a throttle aperture sensor 19 for detecting a throttle aperture according to the stepping-into amount of an unillustrated accelerator pedal, a brake sensor 20 for detecting brake ON (stepping-into) and OFF (release) using the operation of a brake pedal, a vehicle speed sensor 21 for detecting the speed of the vehicle, and an engine rotation number sensor 22 for detecting the number of rotations of the engine 23 are connected to the electronic control unit. Further, an internal combustion engine 23, a motor-generator 25, a battery 26 for supplying electric power for driving the motor, and an automatic speed change mechanism 27 are connected to the electronic control unit.

An unillustrated computer is arranged in the above engine 23, and outputs output torque and inertia torque as a predetermined torque signal on the basis of the number of rotations of a crank shaft of the engine 23. An unillustrated computer is arranged in the above motor 25, and outputs the output torque and the inertia torque as a predetermined torque signal on the basis of the value of an electric current conducted to the motor 25.

The above engine control means 2 executes a control relating to the driving of the engine 23 such as stoppage control of the engine 23. The stoppage control of the engine 23 is based on a vehicle speed detected by the vehicle speed sensor 21, a brake operating state detected by the brake sensor 20, a complete explosion judgment of the engine 23, and an ignition control of the engine 23. In this ignition control, the engine control means 2 turns off an injection and stops the driving of the engine 23 when the engine control means 2 detects, via the vehicle speed sensor 21, that the vehicle speed becomes 0 [Km/h]. Further, after the vehicle begins to run by rotation driving of only the motor 25, the engine control means 2 turns on the injection and performs ignition when the throttle aperture is a predetermined value or more and the engine rotation number is a predetermined value or more. The operation of the engine 23 is then controlled such that the engine 23 is rotated and driven.

The above engine torque calculating means 3 receives the predetermined torque signal including the output torque and the inertia torque from the engine 23, calculates the output torque of the engine 23 and the inertia torque of the engine 23, and outputs the calculated torques to the input torque calculating means 15.

The above motor control means 4 has a driving control means 5, a charging control means 6, a regenerative control means 7 and a limit value setting means 8. The motor control means 4 executes running driving control including starting control, stoppage control and assist control using the motor-generator 25, charging control and regenerative control by each of the means 5, 6 and 7. For example, while electric power is supplied to the motor 25, the electric power supplies is limited by setting the upper and lower limits with respect to voltage and electric current values when the electric power for driving is outputted from the battery 26. The motor control means 4 performs the controls so as to realize maximum vehicle control within a given condition by controlling the motor torque according to the limit value described later and set by the above limit value setting means 8.

The above driving control means 5 controls the operation of the motor-generator 25 at a suitable time on the basis of various conditions such as the vehicle speed detected by the vehicle speed sensor 21, the throttle aperture detected by the throttle aperture sensor 19, or the deceleration intention of a driver detected by the brake sensor 20, commands from the speed change control means 16 and calculation data from the input torque calculating means 15. Namely, for example, when the vehicle stops by a brake operation, the driving control means 5 executes stoppage control for controlling electric current supply so as to stop the rotation driving of the motor 25 in synchronization with the engine 23 that is stopped by the brake operation. Further, when the brake is released after the vehicle has stopped and the vehicle again starts running, the driving control means 5 performs starting control for the motor 25 so as to start the rotation driving while the crank shaft of the engine 23 of a non-ignition state is dragged. Further, for example, the driving control means 5 executes the assist control for outputting the output torque of the motor 25 as positive torque on the basis of the vehicle speed and the throttle aperture, detected by the vehicle speed sensor 21 and the throttle aperture sensor 19 when the output torque of the engine 23 is small (deficient).

When it is necessary to charge the battery 26 on the basis of SOC and SOH judgments of the battery 26 using the battery judging means 9, the above charging control means 6 executes the charging to the battery 26 by the torque of the engine 23 when the engine 23 is already rotated and operated. In contrast to this, when the engine 23 is stopped, the above charging control means 6 gives commands to the engine control means 2 so as to rotate and operate the engine 23 and take out the torque, and executes the charging of the battery 26 by making the motor-generator 25 function as a generator. When the regenerative control is executed by the regenerative control means 7, the charging control means 6 also performs control so as to charge the battery 26 with the electric power (regenerative electric power) obtained by this regenerative control.

The above regenerative control means 7 executes the regenerative control for taking the regenerative torque out of the motor-generator 25 and obtaining the electric power. Tile regenerative control means 7 executes the regenerative control based on the regenerative torque when the vehicle is in a deceleration state based on the vehicle speed detected by the vehicle speed sensor 21, the throttle aperture detected by the throttle aperture sensor 19, or the deceleration intention of the driver detected by the brake sensor 20. In this embodiment, the torque of the motor 25 taken out in the starting control and the assist control is set to "positive torque", and the regenerative torque of the regenerated motor 25 is set to "negative torque".

The above limit value setting means 8 sets the respective upper limit values and the respective lower limit values of the voltage and the electric current of the electric power respectively supplied and collected at the driving and regenerating times of the motor 25. The limit values are set in accordance with the high and low degrees of detected SOC and SOH (deteriorating state) of the battery 26, and the high and low degrees of an outside air temperature described later and detected by the temperature detecting means 11. The limit value setting means 8 selects and sets an adapted limit value map from a plurality of limit value maps prepared in advance so as to cope with control corresponding to various conditions. Thus, the limit value setting means 8 can control the upper and lower limit values so as to be changed every starting control, stoppage control, charging control, assist control and regenerative control mentioned above and relating to the driving of the motor 25. The limit value maps are set as a plurality of maps (maps A to F shown in FIGS. 10 to 15) in advance on the basis of the high and low degrees of the outside air temperature having an influence on the performance of the battery 26, and the high and low degrees of the SOH of the battery 26. The limit value maps are stored (memorized) to an unillustrated memory within the limit value setting means 8.

The above battery judging means 9 judges the SOC and the SOH as follows by monitoring the electric current and the voltage of the battery 26 and monitoring the outside air temperature detected by the temperature detecting means 11 on the basis of the detection of the temperature sensor 17. Namely, (1) The SOH is judged on the basis of the calculation of direct current resistance when the engine 23 is started.

(2) The SOC is judged by accumulating the electric current at the normal running time.

(3) The SOC is judged on the basis of I-V characteristic data of the electric current and the voltage at a so-called idling stop time at which the engine is stopped by signal waiting.

The above motor torque calculating means 10 calculates the output torque of the motor 25 and the inertia torque of the motor 25 by receiving the predetermined torque signal from the motor 25. The motor torque calculating means 10 respectively outputs the calculated output torque and the calculated inertia torque to the input torque calculating means 15, the engine control means 2 and the motor control means 4. The above temperature detecting means 11 detects the temperature (outside air temperature) around the battery, via the temperature sensor 6, having an influence on the performance of the battery 26 and outputs the detected temperature to the motor control means 4.

The above throttle aperture detecting means 12 detects the throttle aperture provided, via the throttle aperture sensor 19, by the stepping-into of the accelerator pedal by a driver and outputs the detected throttle aperture to the engine control means 2 and the motor control means 4. The above brake operating state detecting means 13 detects the operating state of a foot brake (service brake), via the brake sensor 20, for braking or releasing an unillustrated driving wheel by stepping-into the brake pedal and outputs the detected operating state to the engine control means 2 and the motor control means 4.

The above vehicle speed detecting means 28 detects the running speed (vehicle speed) of the vehicle, via the vehicle speed sensor 21, and outputs the detected running speed to the engine control means 2 and the motor control means 4. The engine rotation number detecting means 14 detects the number of engine rotations via the engine rotation number sensor 22 and outputs the detected engine rotation number to the engine control means 2 and the motor control means 4.

The above input torque calculating means 15 calculates inertia torques of the crank shaft, a torque converter, etc. on the basis of the engine rotation number detected via engine rotation number detecting means 14 when the speed change is controlled by the speed change control means 16. The input torque calculating means 15 further calculates total torque obtained by totaling the calculated inertia torques and the output torque and the inertia torque of the engine 23 and the motor 25 calculated by the engine torque calculating means 3 and the motor torque calculating means 10. The input torque calculating means 15 then outputs the calculated total torque to the engine control means 2 and the motor control means 4.

The above speed change control means 16 performs re-gripping control by the engagement and the release of plural clutches and an unillustrated brake arranged in the automatic speed change mechanism 27 on the basis of the vehicle speed detected by the vehicle speed sensor 21 and the throttle aperture detected by the throttle aperture sensor 19. The speed change control means 16 also executes the control of various kinds of speed changes (hereinafter simply called "speed change control") by the automatic speed change mechanism 27. Further, the speed change control means 16 detects a gear ratio (input-output rotation number ratio) on the basis of the number of rotations of unillustrated input and output shafts in the automatic speed change mechanism 27, and judges the actual speed change start and the actual speed change termination on the basis of a change in the gear ratio.

Next, control using the controller in the vehicle of the invention will be explained with reference to FIGS. 3 to 16. FIGS. 3 to 9 are flow charts showing control using the electronic control unit. Each of FIGS. 10 to 15 is a view showing a concrete example of each control. FIG. 16 is a time chart showing one example of this control. In the following explanation, the direction of an electric current in inputting (charging) this electric current to the battery 26 is set to "positive". The direction of the electric current in outputting (taking-out) the electric current from the battery 26 is set to "negative".

First, an unillustrated ignition switch is turned on in a stopping state of the vehicle mounting this controller (electronic control unit) thereto. When a driver operates and moves an unillustrated shift lever arranged in a driver's seat to a running range, the motor control means 4 starts control and obtains the respective detecting results of the battery judging means 9, the temperature detecting means 11, the throttle aperture detecting means 12, the brake operating state detecting means 13, the vehicle speed detecting means 28 and the engine rotation number detecting means 14 as conditions (step S1). The temperature of engine cooling water, the oil temperature of an automatic transmission fluid (ATF) filled in the automatic speed change gear 18, the temperature of the motor 25, the temperature of an unillustrated inverter for generating a driving signal for the motor 25, information relating to fail and the power consumption of an auxiliary machine (auxiliary device) can be further used as these conditions.

Subsequently, the control to be executed is judged on the basis of the conditions obtained in the step S1. In the step S2, it is judged whether it is necessary to start starting (advancing) control by the driving control means 5. When it is judged that this starting control is necessary, it proceeds to a step S3. In the step S3, voltage and electric current limit values corresponding to the outside air temperature and the SOH at the judging time are obtained from a limit value map A shown in FIG. 10A. Thereafter, it proceeds to a step S26.

As shown in FIG. 10A, the above limit value map A corresponding to the starting control is divided into cases in which the outside air temperature having an influence on the performance of the battery 26 is high (30 ° C. or more) and low (less than 0° C.). The above limit value map A is also divided into cases with respect to each of the voltage on the high voltage side, the voltage on the low voltage side, the electric current on the positive side and the electric current on the negative side. Further, each of the high and low cases of the above outside air temperature is also divided into cases in which the SOH is high (80% or more) and low (less than 20%). Numerical values such as the above "30° C. or more" for dividing the outside air temperature and the SOH into the high and low cases are similarly set in FIGS. 11 to 15 described later.

Namely, when the outside air temperature is high and the SOH is high in the limit value map A, the voltage (i.e., upper limit) of the high voltage side is set to 57 V as a limit value of the voltage, and the voltage (i.e., lower limit) of the low voltage side is set to 30 V as a limit value of the voltage. Further, the electric current (i.e., upper limit) of the positive side is set to 500 A as a limit value of the electric current, and the electric current (i.e., lower limit) of the negative side is set to −500 A as a limit value of the electric current. Further, when the outside air temperature is high and the SOH is low, the voltage (upper limit) of the high voltage side is set to 57 V as a limit value of the voltage, and the voltage (lower limit) of the low voltage side is set to 35 V as a limit value of the voltage. Further, the electric current (upper limit) of the positive side is set to 450 A as a limit value of the electric current, and the electric current (lower limit) of the negative side is set to −450 A as a limit value of the electric current.

Further, when the outside air temperature is low and the SOH is high in the limit value map A, the voltage (upper limit) of the high voltage side is set to 57 V as a limit value of the voltage, and the voltage (lower limit) of the low voltage side is set to 35 V as a limit value of the voltage. Further, the electric current (upper limit) of the positive side is set to 450 A as a limit value of the electric current, and the electric current (lower limit) of the negative side is set to −450 A as a limit value of the electric current. Further, when the outside air temperature is low and the SOH is low, the voltage (upper limit) of the high voltage side is set to 57 V as a limit value of the voltage, and the voltage (lower limit) of the low voltage side is set to 40 V as a limit value of the voltage. Further, the electric current (upper limit) of the positive side is set to 400 A as a limit value of the electric current, and the electric current (lower limit) of the negative side is set to −400 A as a limit value of the electric current.

The above limit values of the voltage are shown as a graph in FIG. 10B. The limit values of the electric current are shown as a graph in FIG. 1C. In the graph of FIG. 10B, the axis of abscissa shows the voltage [V], and the axis of ordinate shows a torque limit ratio [%]. As can be understood from these graphs, it is considered that a sudden large electric current is outputted at the output time in the starting control so that the voltage is reduced. Accordingly, the voltage limit value of the low voltage side is set high to cope with this reduction. Further, since a sudden, but not a large, electric current flows at the input time, the voltage limit value of the high voltage side is set to be slightly small.

On the other hand, when it is judged that no starting control is required in the step S2, it proceeds to a step S4. In the step S4, it is judged whether it is necessary to start stoppage control by the driving control means 5. When it is judged that this stoppage control is necessary, it proceeds to a step S5. In the step S5, voltage and electric current limit values are obtained from a limit value map B shown in FIG. 11A. Thereafter, it proceeds to the step S26.

In the above limit value map B corresponding to the stoppage control, as shown in FIG. 11A, when the outside air temperature is high and the SOH is high, the voltage of the high voltage side is set to 54 V as a limit value of the voltage, and the voltage of the low voltage side is set to 28 V as a limit value of the voltage. Further, the electric current of the positive side is set to 500 A as a limit value of the electric current, and the electric current of the negative side is set to −500 A as a limit value of the electric current. Further, when the outside air temperature is high and the SOH is low, the voltage of the high voltage side is set to 50 V as a limit value of the voltage, and the voltage of the low voltage side is set to 32 V as a limit value of the voltage. Further, the electric current of the positive side is set to 450 A as a limit value of the electric current, and the electric current of the negative side is set to −450 A as a limit value of the electric current.

Further, when the outside air temperature is low and the SOH is high in the limit value map B, the voltage of the high voltage side is set to 50 V as a limit value of the voltage, and the voltage of the low voltage side is set to 32 V as a limit value of the voltage. Further, the electric current of the positive side is set to 450 A as a limit value of the electric current, and the electric current of the negative side is set to −450 A as a limit value of the electric current. Further, when the outside air temperature is low and the SOH is low, the voltage of the high voltage side is set to 46 V as a limit value of the voltage, and the voltage of the low voltage side is set to 37 V as a limit value of the voltage. Further, the electric current of the positive side is set to 400 A as a limit value of the electric current, and the electric current of the negative side is set to −400 A as a limit value of the electric current.

The above limit values of the voltage are shown as a graph in FIG. 11B. The limit values of the electric current are shown as a graph in FIG. 11C. As can be understood from these graphs, since both the output and the input of the electric current exist in the stoppage control, the voltage limit value is set high on the low voltage side, and is set low on the high voltage side. Therefore, the electric current limit value is also set to be small.

In contrast to this, when it is judged that no stoppage control is required in the step S4, it proceeds to a step S6. In the step S6, it is judged whether it is necessary to start charging control by the charging control means 6. As this result, when it is judged that this charging control is required, it proceeds to a step S7. In the step S7, voltage and electric current limit values are obtained from the limit value map C shown in FIG. 12A. Thereafter, it proceeds to the step S26.

In the above limit value map C corresponding to the charging control, as shown in FIG. 12A, when the outside air temperature is high and the SOH is high, the voltage of the high voltage side is set to 56 V as a limit value of the voltage, and the voltage of the low voltage side is set to 21 V as a limit value of the voltage. Further, the electric current of the positive side is set to 540 A as a limit value of the electric current, and the electric current of the negative side is set to 0 A as a limit value of the electric current. Further, when the outside air temperature is high and the SOH is low, the voltage of the high voltage side is set to 54 V as a limit value of the voltage, and the voltage of the low voltage side is set to 21 V as a limit value of the voltage. Further, the electric current of the positive side is set to 520 A as a limit value of the electric current, and the electric current of the negative side is set to 0 A as a limit value of the electric current.

Further, when the outside air temperature is low and the SOH is high in the limit value map C, the voltage of the high voltage side is set to 54 V as a limit value of the voltage, and the voltage of the low voltage side is set to 21 V as a limit value of the voltage. Further, the electric current of the positive side is set to 520 A as a limit value of the electric current, and the electric current of the negative side is set to 0 A as a limit value of the electric current. Further, when the outside air temperature is low and the SOH is low, the voltage of the high voltage side is set to 52 V as a limit value of the voltage, and the voltage of the low voltage side is set to 21 V as a limit value of the voltage. Further, the electric current of the positive side is set to 500 A as a limit value of the electric current, and the electric current of the negative side is set to 0 A as a limit value of the electric current.

The above limit values of the voltage are shown as a graph in FIG. 12B. The limit values of the electric current are shown as a graph in FIG. 12C. As can be understood from these graphs, since no sudden large electric current flows in the charging control, the high voltage side of the voltage limit value and the positive side of the electric current limit value are set to be slightly small. Further, the low voltage side of the voltage limit value is set to a lowest value (lowermost limit value), and the negative side of the electric current limit value is set to a lowest electric current value for realizing negative torque, and the positive torque is lost during the speed control.

In contrast to this, when it is judged that no charging control is required in the step S6, it proceeds to a step S8. In the step S8, it is judged whether it is necessary to start assist control by the driving control means 5. As this result, when it is judged that the assist control is required, it proceeds to a step S9. In the step S9, voltage and electric current limit values are obtained from a limit value map D shown in FIG. 13A. Thereafter, it proceeds to the step S26.

In the above limit value map D corresponding to the assist control, as shown in FIG. 13A, when the outside air temperature is high and the SOH is high, the voltage of the high voltage side is set to 57 V as a limit value of the voltage, and the voltage of the low voltage side is set to 30 V as a limit value of the voltage. Further, the electric current of the positive side is set to 0 A as a limit value of the electric current, and the electric current of the negative side is set to −500 A as a limit value of the electric current. Further, when the outside air temperature is high and the SOH is low, the voltage of the high voltage side is set to 57 V as a limit value of the voltage, and the voltage of the low voltage side is set to 35 V as a limit value of the voltage. Further, the electric current of the positive side is set to 0 A as a limit value of the electric current, and the electric current of the negative side is set to −450 A as a limit value of the electric current.

Further, when the outside air temperature is low and the SOH is high in the limit value map D, the voltage of the high voltage side is set to 57 V as a limit value of the voltage, and the voltage of the low voltage side is set to 35 V as a limit value of the voltage. Further, the electric current of the positive side is set to 0 A as a limit value of the electric current, and the electric current of the negative side is set to −450 A as a limit value of the electric current. Further, when the outside air temperature is low and the SOH is low, the voltage of the high voltage side is set to 57 V as a limit value of the voltage, and the voltage of the low voltage side is set to 40 V as a limit value of the voltage. Further, the electric current of the positive side is set to 0 A as a limit value of the electric current, and the electric current of the negative side is set to −400 A as a limit value of the electric current.

The above limit values of the voltage are shown as a graph in FIG. 13B. The limit values of the electric current are shown as a graph in FIG. 13C. As can be understood from these graphs, since a sudden large electric current is outputted in the assist control, the low voltage side of the voltage limit value and the negative side of the electric current limit value are set high, respectively. Further, in the assist control, the positive side of the electric current limit value is set to a maximum electric current value for realizing positive torque, and the high voltage side of the voltage limit value is set to a maximum value, and the negative torque is lost during the speed control.

In contrast to this, when it is judged that no assist control is required in the step S8, it proceeds to a step S10. In the step S10, it is judged whether it is necessary to start regenerative control by the regenerative control means 7. As this result, when it is judged that this regenerative control is required, it proceeds to a step S11. In the step S11, voltage and electric current limit values are obtained from a limit value map E shown in FIG. 14A. Thereafter, it proceeds to the step S26.

In the above limit value map E corresponding to the regenerative control, as shown in FIG. 14A, when the outside air temperature is high and the SOH is high, the voltage of the high voltage side is set to 54 V as a limit value of the voltage, and the voltage of the low voltage side is set to 22 V as a limit value of the voltage. Further, the electric current of the positive side is set to 520 A as a limit value of the electric current, and the electric current of the negative side is set to 0 A as a limit value of the electric current. Further, when the outside air temperature is high and the SOH is low, the voltage of the high voltage side is set to 50 V as a limit value of the voltage, and the voltage of the low voltage side is set to 22 V as a limit value of the voltage. Further, the electric current of the positive side is set to 500 A as a limit value of the electric current, and the electric current of the negative side is set to 0 A as a limit value of the electric current.

Further, when the outside air temperature is low and the SOH is high in the limit value map E, the voltage of the high voltage side is set to 50 V as a limit value of the voltage, and the voltage of the low voltage side is set to 22 V as a limit value of the voltage. Further, the electric current of the positive side is set to 500 A as a limit value of the electric current, and the electric current of the negative side is set to 0 A as a limit value of the electric current. Further, when the outside air temperature is low and the SOH is low, the voltage of the high voltage side is set to 46 V as a limit value of the voltage, and the voltage of the low voltage side is set to 22 V as a limit value of the voltage. Further, the electric current of the positive side is set to 480 A as a limit value of the electric current, and the electric current of the negative side is set to 0 A as a limit value of the electric current.

The above limit values of the voltage are shown as a graph in FIG. 14B. The limit values of the electric current are shown as a graph in FIG. 14C. As can be understood from these graphs, since a large electric current suddenly generated is inputted in the regenerative control, both the high voltage side of the voltage limit value and the positive side of the electric current limit value are set to be small. Further, in the regenerative control, the negative side of the electric current limit value is set to a lowest electric current value for realizing negative torque, and the low voltage side of the voltage limit value is set to a minimum value, and the positive torque is lost during the speed control.

In contrast to this, when it is judged that no regenerative control is required in the step S10, it proceeds to a step S12. In the step S12, voltage and electric current limit values are obtained from a limit value map F shown in FIG. 15A. Thereafter, it proceeds to the step S26.

In the above limit value map F corresponding to another control except for the starting control, the stoppage control, the charging control, the assist control and the regenerative control mentioned above, as shown in FIG. 15A, when the outside air temperature is high and the SOH is high, the voltage of the high voltage side is set to 57 V as a limit value of the voltage, and the voltage of the low voltage side is set to 21 V as a limit value of the voltage. Further, the electric current of the positive side is set to 550 A as a limit value of the electric current, and the electric current of the negative side is set to −550 A as a limit value of the electric current. Further, when the outside air temperature is high and the SOH is low, the voltage of the high voltage side is set to 55 V as a limit value of the voltage, and the voltage of the low voltage side is set to 24 V as a limit value of the voltage. Further, the electric current of the positive side is set to 520 A as a limit value of the electric current, and the electric current of the negative side is set to −520 A as a limit value of the electric current.

Further, when the outside air temperature is low and the SOH is high in the limit value map F, the voltage of the high voltage side is set to 55 V as a limit value of the voltage, and the voltage of the low voltage side is set to 24 V as a limit value of the voltage. Further, the electric current of the positive side is set to 520 A as a limit value of the electric current, and the electric current of the negative side is set to −520 A as a limit value of the electric current. Further, when the outside air temperature is low and the SOH is low, the voltage of the high voltage side is set to 52 V as a limit value of the voltage, and the voltage of the low voltage side is set to 26 V as a limit value of the voltage. Further, the electric current of the positive side is set to 500 A as a limit value of the electric current, and the electric current of the negative side is set to −500 A as a limit value of the electric current.

The above limit values of the voltage are shown as a graph in FIG. 15B. The limit values of the electric current are shown as a graph in FIG. 15C. As can be understood from these graphs, in another control, the widths of the upper and lower limits of the voltage limit value and the widths of the positive and negative sides of the electric current limit value are set relatively wide to have a wide use property so as to cope with various controls.

As mentioned above, as shown by the limit value maps A to F, in the electronic control unit in this embodiment mode, the respective widths of the voltage and electric current limit values are set to be relatively wide in the case of the high outside air temperature and the high SOH, and are set to be relatively narrow in the case of the low outside air temperature and the low SOH in consideration of the following two points. Namely, (1) If the outside air temperature is low, the battery temperature is also low. In the situation of the low outside air temperature, a chemical reaction speed within the battery becomes slow so that it is difficult to charge and discharge a large electric current.

(2) When the SOH of the battery 26 is low (namely, the battery 26 is exhausted), the voltage is apparently high and the SOC is also high. However, when the electric current is taken (outputted) out of the battery 26, the voltage is reduced at a stretch.

Next, in the step S26, a torque command value as a target value is inputted. Further, in a step S13, it is judged whether a failure relating to the motor 25 is generated on the basis of the plural conditions obtained in the above step S1. When it is judged that there is a failure, an ONm command for rotating and driving the motor 25 is issued in a step S14 and it proceeds to a step S17. In contrast to this, when it is judged that there is no failure in the step S13, direct current voltage and electric current limit control is executed in a step S15. Thereafter, obtaining processing of various kinds of limit values is executed in a step S16, and motor torque is outputted in the step S17.

In the above step S15, the motor-generator 25 is operated while the direct current voltage and electric current limit control is executed by PI control on the basis of the voltage and electric current limit values obtained in advance in steps S3, S5, S7, S9, S11 and S12, and the torque command value inputted in the step S26. In the PI control, a proportional operation for outputting a value proportional to an input amount and an integrating operation for outputting an integrating value of the input amount are executed, and an adjustment is made such that the operating amount becomes an amount proportional to the deviation between the target value (torque command value) and the present value.

Figure 4:
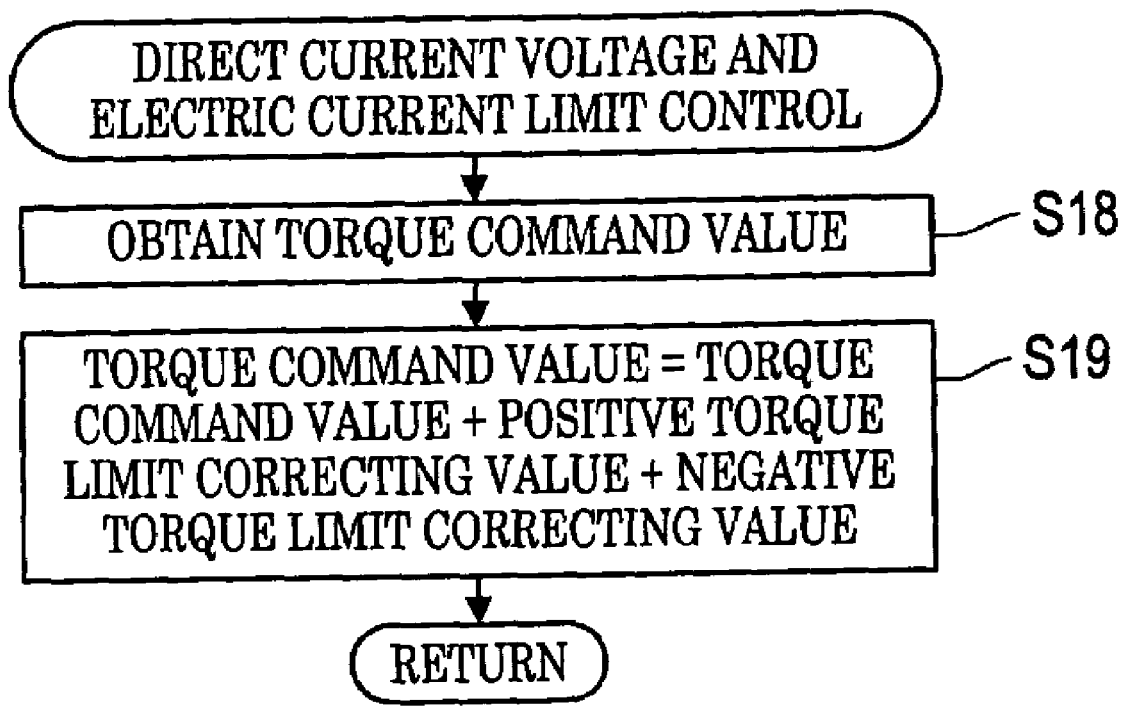

Here, FIG. 4 shows a subroutine of the "direct current voltage and electric current limit control" in the above step S15. As shown in this figure, the torque command value is first obtained in a step S18. In a step S19, a positive torque limit correcting value and a negative torque limit correcting value described later are added to this torque command value so that the torque command value is calculated.

Figure 5A:
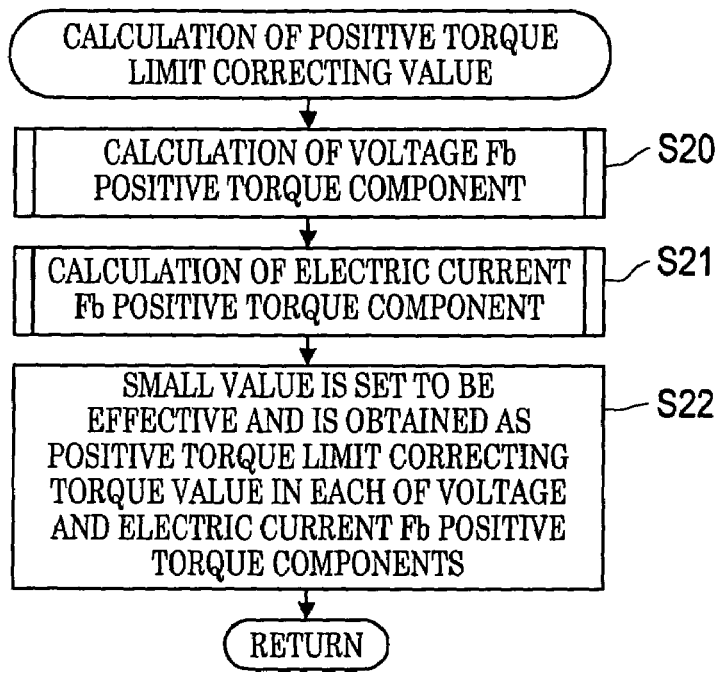
Figure 5B:
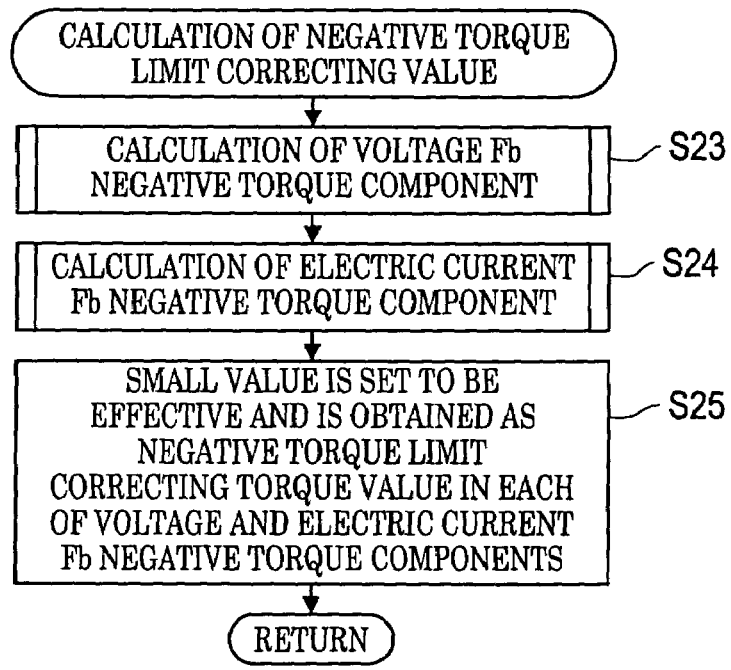

Here, FIG. 5A shows the details of calculation processing of the positive torque limit correcting value in the above step S19. FIG. 5B shows the details of calculation processing of the negative torque limit correcting value. First, as shown in FIG. 5A, in the calculation processing of the positive torque limit correcting value, when this processing is started, a voltage Fb (feedback) positive torque component is calculated in a step S20. Thereafter, an electric current Fb positive torque component is calculated in a step S21. Subsequently, in a step S22, a small value is set to be effective and is obtained as a positive torque limit correcting value in each of the voltage Fb positive torque component and the electric current Fb positive torque component. Thereafter, return processing is performed.

On the other hand, in the calculation processing of the negative torque limit correcting value, as shown in FIG. 5B, a voltage Fb negative torque component is first calculated in a step S23. Thereafter, an electric current Fb (feedback) negative torque component is calculated in a step S24. In a step S25, a small value is then set to be effective and is obtained as a negative torque limit correcting value in each of the voltage Fb negative torque component and the electric current Fb negative torque component. Thereafter, return processing is performed.

Figure 6:
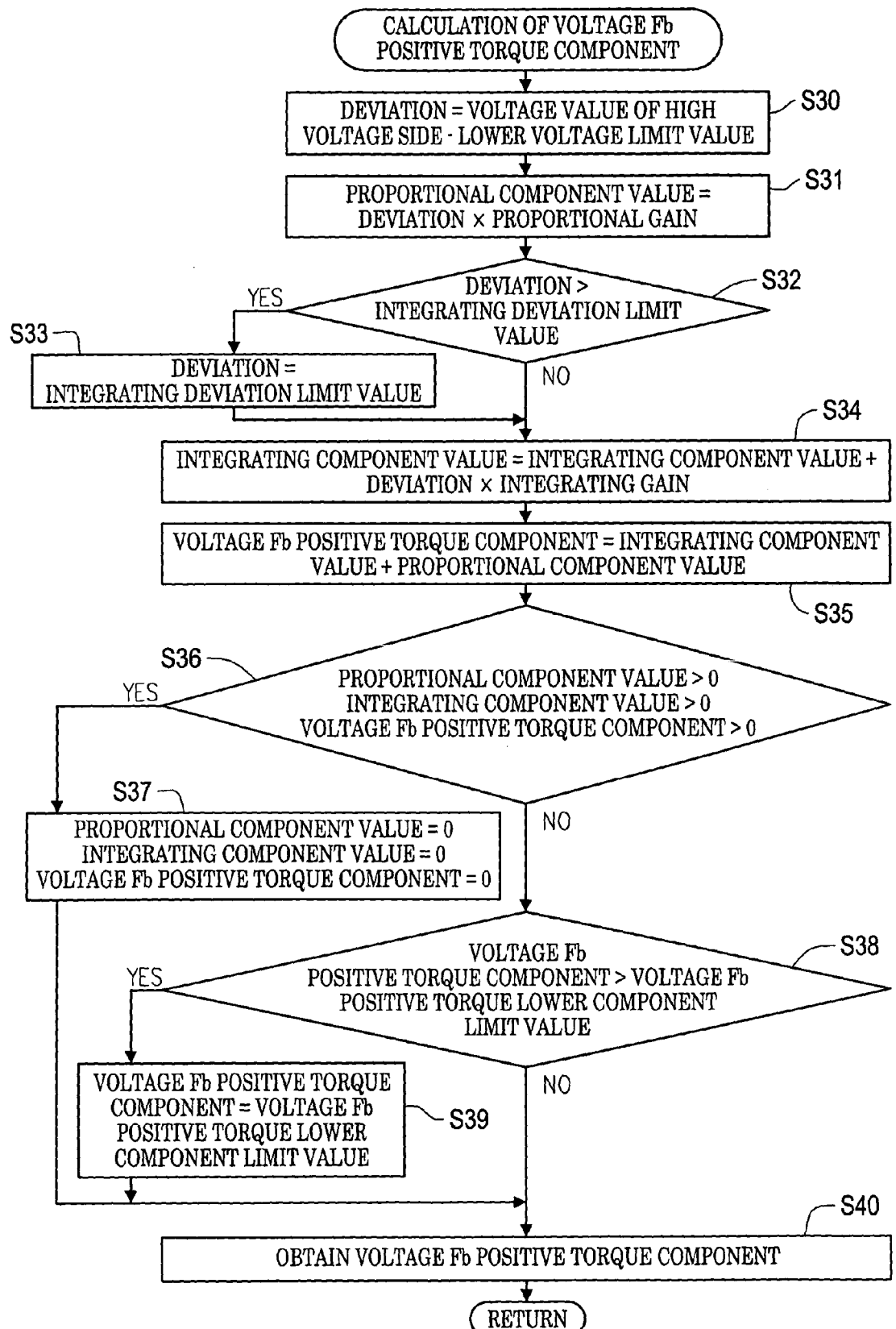
Figure 7:
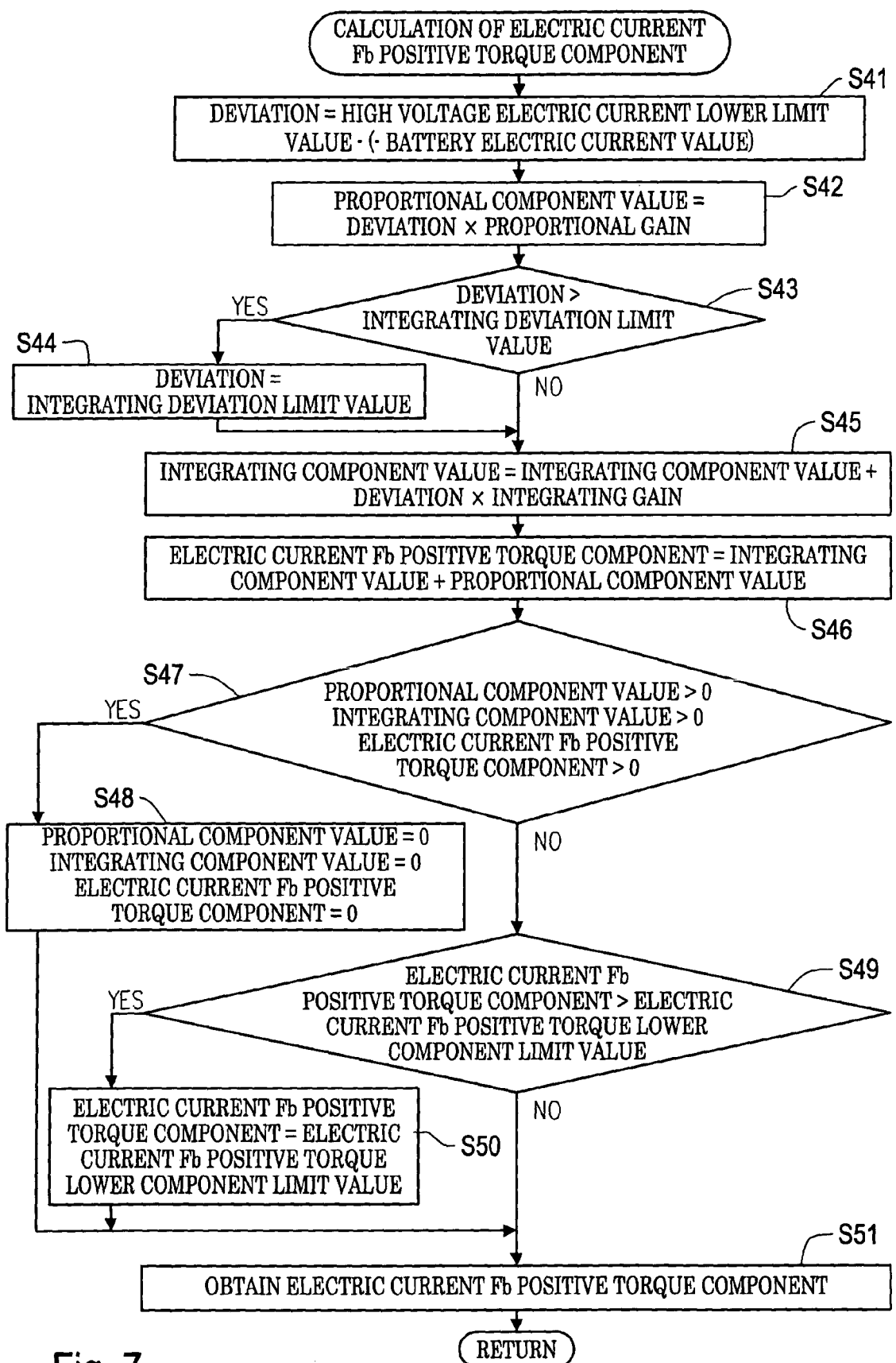

FIG. 6 shows a subroutine of "the calculation of the voltage Fb positive torque component" of the above step S20 in FIG. 5A. FIG. 7 shows a subroutine of "the calculation of the electric current Fb positive torque component" of the above step S21 in FIG. 5A.

As shown in FIG. 6, in the processing of "the calculation of the voltage Fb positive torque component", the deviation between the present voltage value of the battery 26 and the lower voltage limit value is calculated by subtracting the lower voltage limit value from the voltage value of the high voltage side in a step S30. Here, the lower voltage limit value may be set as a constant (e.g., 20 V for the protecting purpose of an unillustrated DC/DC converter), but can be also set as a variable.

Subsequently, in a step S31, a proportional component value is calculated by multiplying the deviation calculated in the above step S30 by a proportional gain. Both the proportional gain value and an integrating gain value described later are set to be variable, and are changed in accordance with the state of the vehicle. For example, when a limit value for hardware protection of the battery 26 and the motor 25 is applied, processing such as raising of the proportional gain value is performed. In the case of the normal control, processing for returning the proportional gain value to an initial value is performed. These values can be also set to constants.

Subsequently, in a step S32, the above deviation and the integrating deviation limit value are compared with each other, and it is judged whether the deviation is greater than the integrating deviation limit value. As this result, when it is judged that the deviation is greater than the integrating deviation limit value, the deviation is to the integrating deviation limit value in a step S33 and it proceeds to a step S34. In contrast to this, when it is judged that the deviation is the integrating deviation limit value or less in the step S32, it proceeds to the step S34 as it is and an integrating component value is calculated by the following formula, integrating component value=integrating component value+deviation×integrating gain.

Further, in a step S35, the voltage Fb positive torque component is calculated by the following formula, voltage Fb positive torque component=integrating component value+proportional component value.

In a step S36, it is judged whether the condition of proportional component value>0, integrating component value>0 and voltage Fb positive torque component>0 is satisfied (here, since a limit judgment at the positive torque time is made, it is limited to 0 when the positive torque is further corrected). As this result, when it is judged that the condition of proportional component value>0, integrating component value>0 and voltage Fb positive torque component>0 is satisfied, it proceeds to a step S37 and proportional component value=0, integrating component value=0 and voltage Fb positive torque component=0 are set, and it proceeds to a step S40 (namely, it is cleared to 0 for control of the next time). In contrast to this, when it is judged in the step S36 that no condition of proportional component value>0, integrating component value>0 and voltage Fb positive torque component>0 is satisfied, it proceeds to a step S38.

In the step S38, the voltage Fb positive torque component and a voltage Fb positive torque lower component limit value are compared with each other, and it is judged whether the voltage Fb positive torque component is greater than the voltage Fb positive torque lower component limit value. As this result, when it is judged that voltage Fb positive torque component>voltage Fb positive torque lower component limit value is satisfied, voltage Fb positive torque component=voltage Fb positive torque lower component limit value is set in a step S39, and it proceeds to a step S40. In contrast to this, when it is judged in the step S38 that the voltage Fb positive torque component is the voltage Fb positive torque component limit value or less, it proceeds to the step S40 as it is and this voltage Fb positive torque component is obtained.

Next, as shown in FIG. 7, in the processing of "the calculation of the electric current Fb positive torque component", the deviation of the present direct electric current value is calculated in the step S41 by the following formula, deviation=high voltage electric current lower limit value−(−battery electric current value), i.e., by subtracting the negative value of the battery electric current value from the lower limit value of the electric current. Since this processing is the calculation of the positive torque component, it is sufficient to suppose a case in which the electric current is outputted. Accordingly, only the lower limit value is judged in this processing. Further, the lower limit value of the electric current may be set to a constant (e.g., −700 A for the protecting purpose of an inverter), but can be also set to a variable.

In a step S42, the proportional component value is then calculated by the following formula, proportional component value=deviation×proportional gain.

Both the proportional gain value and an integrating gain value described later are set to be variable in accordance with the state of the vehicle. For example, when the limit value of hardware protection is applied, control is performed so as to raise the gain values. At the normal control time, processing for returning the gain values to initial values, etc. is performed. These gain values can be also set to constants.

Subsequently, in a step S43, the deviation and the integrating deviation limit value are compared with each other, and it is judged whether the deviation is greater than the integrating deviation limit value. As this result, when it is judged that the deviation is greater than the integrating deviation limit value, deviation=integrating deviation limit value is set in a step S44 and it proceeds to a step S45. In contrast to this, when it is judged in the step S43 that the deviation is the integrating deviation limit value or less, it proceeds to the step S45 as it is, and the integrating component value is calculated by the following formula, integrating component value=integrating component value+deviation×integrating gain.

Further, in a step S46, the electric current Fb positive torque component is calculated by the following formula, electric current Fb positive torque component=integrating component value+proportional component value.

Subsequently, it is judged in a step S47 whether the condition of proportional component value>0, integrating component value>0 and electric current Fb positive torque component>0 is satisfied (here, since a limit judgment at the positive torque time is made, it is limited to 0 when the positive torque is further corrected). As this result, when it is judged that the condition of proportional component value>0, integrating component value>0 and electric current Fb positive torque component>0 is satisfied, it proceeds to a step S48, and proportional component value=0, integrating component value=0 and electric current Fb positive torque component=0 are set and it proceeds to a step S51 (namely, it is cleared to 0 for control of the next time). In contrast to this, when it is judged in the step S47 that no condition of proportional component value>0, integrating component value>0 and electric current Fb positive torque component>0 is satisfied, it proceeds to a step S49.

In the step S49, the electric current Fb positive torque component and an electric current Fb positive torque lower component limit value are compared with each other, and it is judged whether the electric current Fb positive torque component is greater than the electric current Fb positive torque lower component limit value. As this result, when it is judged that electric current Fb positive torque>electric current Fb positive torque lower component limit value is satisfied, electric current Fb positive torque component=electric current Fb positive torque lower component limit value is set in a step S50, and it proceeds to a step S51. In contrast to this, when it is judged in the step S49 that the electric current Fb positive torque component is the electric current Fb positive torque lower component limit value or less, it proceeds to the step S51 as it is, and its electric current Fb positive torque component is obtained.

Figure 8:
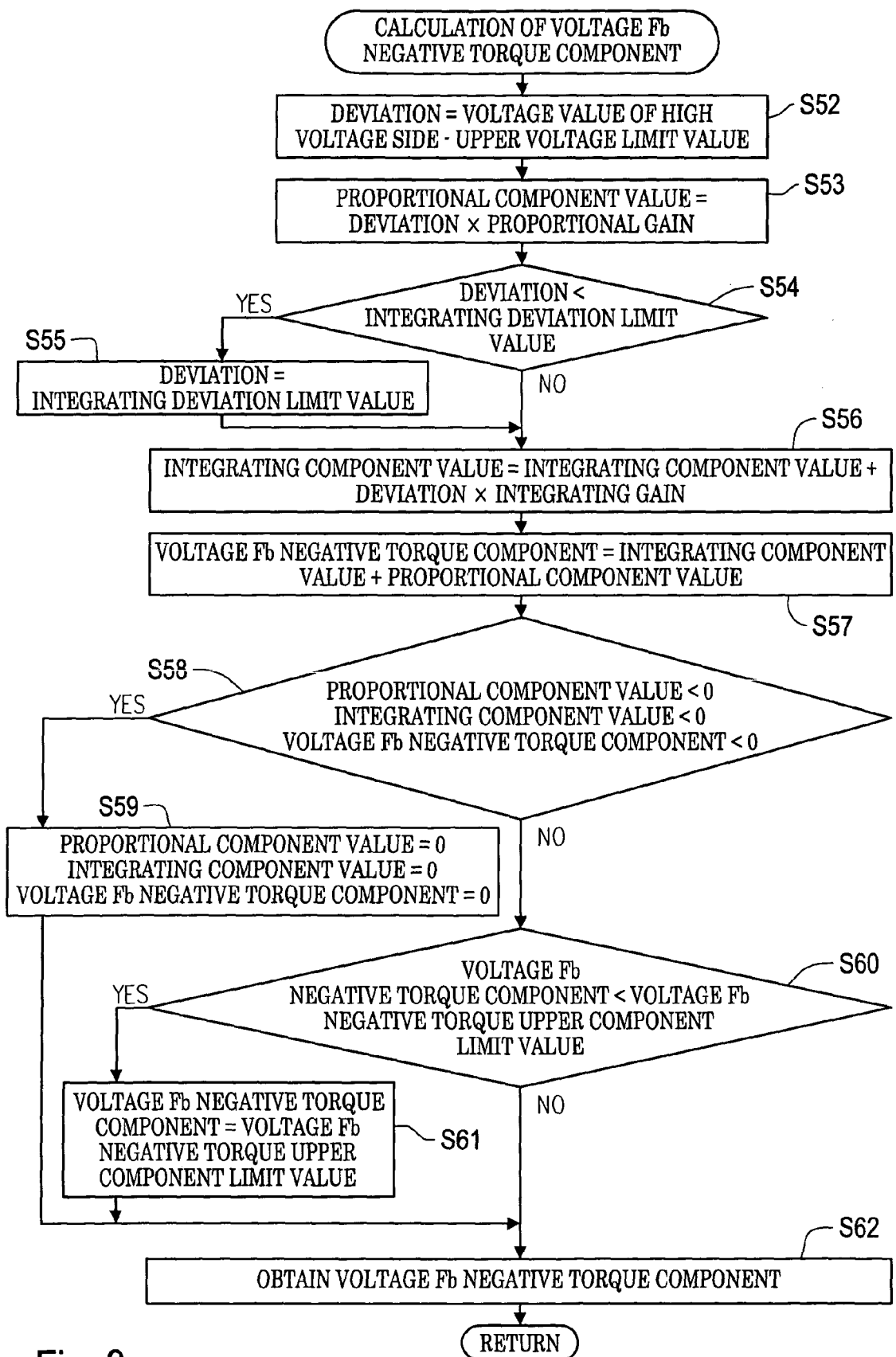
Figure 9:
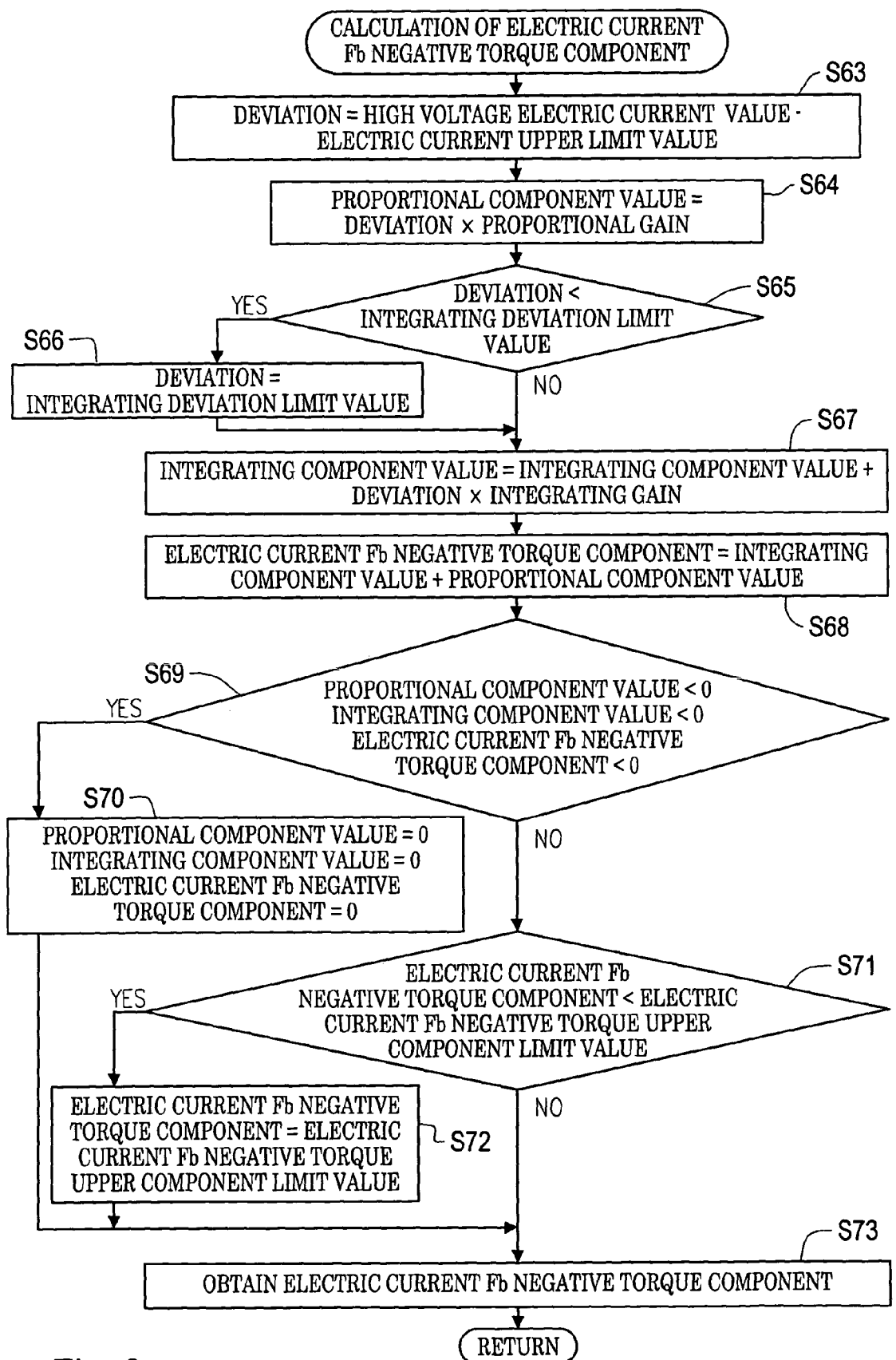

Subsequently, FIG. 8 shows a subroutine of "the calculation of the voltage Fb negative torque component" of the above step S23 in FIG. 5B. FIG. 9 shows a subroutine of "the calculation of the electric current Fb negative torque component" of the above step S24 in FIG. 5B.

Namely, as shown in FIG. 8, in the processing of "the calculation of the voltage Fb negative torque component", the deviation between the present direct current voltage value and an upper voltage limit value is calculated by subtracting the upper voltage limit value from the voltage value of the high voltage side in a step S52. Here, the upper voltage limit value may be set to a constant (e.g., 42 V for the protecting purpose of a DC/DC converter), but can be also set to a variable.

In a step S53, the proportional component value is calculated by multiplying the deviation calculated in the above step S52 by a proportional gain. Here, similar to the case of the step S31 of FIG. 6, both the proportional gain value and an integrating gain value described later are set to be variable and are changed in accordance with the state of the vehicle.

Further, in a step S54, the above deviation and an integrating deviation limit value are compared with each other, and it is judged whether the deviation is smaller than the integrating deviation limit value. As this result, when it is judged that the deviation is smaller than the integrating deviation limit value, deviation=integrating deviation limit value is set in a step S55 and it proceeds to a step S56. In contrast to this, when it is judged in the step S54 that the deviation is the integrating deviation limit value or more, it proceeds to the step S56 as it is, and the integrating component value is calculated by the following formula, integrating component value=integrating component value+deviation×integrating gain.

In a step S57, the voltage Fb negative torque component is calculated by the following formula, voltage Fb negative torque component=integrating component value+proportional component value.

Subsequently, it is judged in a step S58 whether the condition of proportional component value<0, integrating component value<0 and voltage Fb negative torque component<0 is satisfied (here, since a limit judgment at the negative torque time is made in the step S58, it is limited to 0 when the negative torque is further corrected). As this result, when the condition of proportional component value<0, integrating component value<0 and voltage Fb negative torque component<0 is satisfied, it proceeds to a step S59, and proportional component value=0, integrating component value=0 and voltage Fb negative torque component=0 are set. Then, it proceeds to a step S62 (namely, it is cleared to 0 for control of the next time). In contrast to this, when it is judged in the step S58 that no condition of proportional component value<0, integrating component value<0 and voltage Fb negative torque component<0 is satisfied, it proceeds to a step S60.

In the step S60, the voltage Fb negative torque component and a voltage Fb negative torque upper component limit value are compared with each other, and it is judged whether the voltage Fb negative torque component is smaller than the voltage Fb negative torque upper component limit value. As this result, when voltage Fb negative torque component<voltage Fb negative torque upper component limit value is satisfied, voltage Fb negative torque component=voltage Fb negative torque upper component limit value is set in a step S61, and it proceeds to a step S62.

In contrast to this, when it is judged in the step S60 that the voltage Fb negative torque component is the voltage Fb negative torque upper component limit value or more, it proceeds to the step S62 as it is, and its voltage Fb negative torque component is obtained.

Next, as shown in FIG. 9, in the processing of "the calculation of the electric current Fb negative torque component", the deviation of the present direct electric current value is calculated in a step S63 by the following formula, deviation=high voltage electric current value−electric current upper limit value. Since this processing is the calculation of the negative torque component, it is sufficient to suppose a case in which the electric current is inputted. Accordingly, in this processing, only the upper limit value is judged. Further, the upper limit value of the electric current may be set to a constant (e.g., 700 A for the protecting purpose of an inverter), but can be also set to a variable.

In a step S64, the proportional component value is calculated by the following formula, proportional component value=deviation×proportional gain.

Both the proportional gain value and an integrating gain value described later are set to be variable in accordance with the state of the vehicle. For example, when the limit value of hardware protection is applied, control is performed so as to raise the gain values. At the normal control time, processing for returning the gain values to initial values is performed. These values can be also set to constants.

Subsequently, in a step S65, the deviation and an integrating deviation limit value are compared with each other, and it is judged whether the deviation is smaller than the integrating deviation limit value. As this result, when it is judged that the deviation is smaller than the integrating deviation limit value, deviation=integrating deviation limit value is set in a step S66, and it proceeds to a step S67. In contrast to this, when it is judged in the step S65 that the deviation is the integrating deviation limit value or more, it proceeds to the step S67 as it is, and the integrating component value is calculated by the following formula, integrating component value=integrating component value+deviation×integrating gain.

Further, in a step S68, the electric current Fb negative torque component is calculated by the following formula, electric current Fb negative torque component=integrating component value+proportional component value.

Subsequently, it is judged in a step S69 whether the condition of proportional component value<0, integrating component value<0 and electric current Fb negative torque component<0 is satisfied (since a limit judgment at the negative torque time is here made, it is limited to 0 when the negative torque is further corrected). As this result, when it is judged that the condition of proportional component value<0, integrating component value<0 and electric current Fb negative torque component<0 is satisfied, it proceeds to a step S70, and proportional component value=0, integrating component value=0 and electric current Fb negative torque component=0 are set and it proceeds to a step S73 (namely, it is cleared to 0 for control of the next time). In contrast to this, when it is judged in the step S69 that no condition of proportional component value<0, integrating component value<0 and electric current Fb negative torque component<0 is satisfied, it proceeds to a step S71.

In the step S71, the electric current Fb negative torque component and an electric current Fb negative torque upper component limit value are compared with each other, and it is judged whether the electric current Fb negative torque component is smaller than the electric current Fb negative torque upper component limit value. As this result, when it is judged that electric current Fb negative torque component<electric current Fb negative torque upper component limit value is satisfied, electric current Fb negative torque component=electric current Fb negative torque upper component limit value is set in a step S72, and it proceeds to a step S73. In contrast to this, when it is judged in the step S71 that the electric current Fb negative torque component is the electric current Fb negative torque upper component limit value or more, it proceeds to the step S73 as it is and its electric current Fb negative torque component is obtained.

As mentioned above, in accordance with the controller of this embodiment mode, even when the electric current flows similarly to the high SOH case in the reducing case of the SOH of the battery 26, control is performed in the direct current voltage and electric current limit control of the above step S115 while the upper and lower limit values are arranged with respect to both the voltage value and the electric current value of electric power at the output time of driving electric power from the battery 26 and the input time of regenerative electric power to the battery 26. Accordingly, there is no disadvantage in that the voltage is suddenly reduced after the supply of the electric current.

Namely, the battery state detecting means (9, 11) in this controller detects at least the deteriorating state of the battery 26 and the outside air temperature (or the battery temperature) as the battery state which is a condition relating to motor control. Further, the limit value setting means 8 respectively precisely sets the upper and lower limit values with respect to the voltage value and the electric current value at the output time of the electric power for driving, and the voltage value and the electric current value at the input time of the regenerative electric power in accordance with the above battery state. Accordingly, the occurrence of the above disadvantage can be reliably prevented.

Accordingly, in accordance with this controller, the generation of an overcurrent is reliably prevented, and the hunting possibly generated in the conventional HEV control is avoided. Further, hardware such as the battery 26 and the motor 25 is protected, and stable motor driving control can be realized. Further, when the SOC of the battery 26 is reduced, the upper limit value is narrowed and the lower limit value is widened so that the advantage of facilitating management of the SOC is also obtained. Further, while the electric power, that is supplied to the motor 25 to drive the motor 25, is limited by setting the upper and lower limit values to the voltage value and the electric current value at the output time of the electric power for driving, the motor control means 4 controls motor torque in accordance with these limit values. Accordingly, it is possible to realize vehicle control at its maximum within a given condition.

Further, in this controller, the upper limit value and the lower limit value are changed every control of start, stoppage, charging and assist and regeneration relating to the driving of the motor 25. In accordance with the high and low degrees of conditions such as the SOH and the outside air temperature detected by the battery judging means 9 and the temperature detecting means 11, the limit value setting means 8 respectively sets the upper and lower limit values to the voltage value and the electric current value in outputting the electric power for driving the motor 25 from the battery 26, and the voltage value and the electric current value in inputting the regenerative electric power at the regenerative time using the motor 25 to the battery 26. Accordingly, it is possible to perform fine control according to situations in each of various controls. Further, the limit values of both the voltage and the electric current are set in accordance with the SOH of the battery 26 and the outside air temperature. Accordingly, for example, the influence of exhaustion of the battery 26 on the starting control can be restrained at its minimum by widely setting the upper and lower limit widths of the limit values at the starting control time at a low temperature time at which the SOH is greatly influenced by the outside air temperature.

In this controller, the limit value setting means 8 selects a limit value map adapted for the control to be executed from the plural limit value maps A to F. Accordingly, the setting of the upper and lower limit values can be precisely executed only by selecting the adapted limit value map from the plural limit value maps prepared in advance at a suitable time on the basis of a predetermined parameter.

Here, FIG. 16 shows one example of the motor driving control using the controller of this embodiment mode. In this figure, reference numeral A shows a change in the SOC of the battery 26, and reference numeral B shows a change in a torque command value (target value) to the motor 25. Reference numeral C shows a change in the actual torque value (prevent value) outputted from the motor 25, and reference numeral D shows a change in the electric current outputted from the battery 26. Reference numeral E shows a change in the voltage outputted from the battery 26.

As shown by B of FIG. 16, while the torque command value (MtTrq0dr) is outputted so as to drive the motor 25 at a predetermined torque [Nm], me SOC of the battery 26 is gradually reduced with the passage of time as shown by A. As a result of the PI control executed so as to achieve the target value of B, the present torque value (MtTrq) of the motor 25 is changed as shown by C while a changing curve slightly lower than the torque command value is drawn. In this case, the limit values with respect to the voltage and the electric current are set by the limit value setting means 8 correspondingly with one of the starting control, the stoppage control, the charging control, the assist control, the regenerative control, etc. Namely, as shown by E, no voltage of the electric power outputted from the battery 26 to drive the motor is lowered over the lower limit value irrespective of the high and low degrees of the SOH of the battery 26 by setting the lower limit value of the voltage. Thus, as shown by D, the electric current outputted from the battery 26 to drive the motor is outputted slightly over the lower limit value at the electricity starting time, but is then stably outputted along this lower limit value. Further, this electric current is reduced when the drop of the voltage value is limited by the lower limit value. Therefore, the actual torque value of the motor 25 is controlled so as to be slightly reduced as shown by C as the electric current value is reduced.

In accordance with the controller of the conventional type, the control result different from the control result using the above controller of the invention is obtained as shown in FIG. 17. Namely, in the type of this figure, the upper and lower limit values are set only on the electric current side, and are not set on the voltage side. Therefore, as shown by E, the voltage is suddenly reduced by the SOH from a certain time point of the electric power supply. Thus, a large amount of electric current tends to be flowed, and the electric current value is provided along the lower limit value as shown by D of this figure, and the actual torque value of the motor is approximately constant as shown by C. However, as this result, it is supposed that the disadvantages of rapid deterioration of the battery and shortening of motor life due to an overcurrent are caused.

In this embodiment mode, the hybrid vehicle of a parallel system running by using driving forces of both the engine 23 and the motor 25 is explained as an example. However, the invention is not limited to this example. For example, the invention can be also naturally applied to the hybrid vehicle of a series system running by the driving force of the motor while electricity is generated by the driving force of the engine, and an electric vehicle (EV) of a form running by only the driving force of the motor without mounting the engine.

In accordance with another embodiment of the invention, the controller changes the upper and lower limit values for every control relating to the driving of the motor. Accordingly, it is possible to realize fine control according to situations in each of various controls of starting, stoppage, charging, assist, regeneration, etc.

In accordance with another embodiment of the invention, the controller detects at least the deteriorating state of the battery, the outside air temperature or the battery temperature as the battery state. Accordingly, the upper and lower limit values with respect to the voltage value and the electric current value at the output time of the electric power for driving and the voltage value and the electric current value at the input time of the regenerative electric power can be respectively precisely set.

In accordance with another embodiment of the invention, the controller selects a limit value map adapted for execution from a plurality of limit value maps. Accordingly, the setting of the upper and lower limit values can be precisely executed only by selecting an adapted limit value map from the plurality of limit value maps prepared in advance at a suitable time on the basis of a predetermined parameter.

In accordance with another embodiment of the invention, for example, while the electric power for driving the motor is limited by setting the upper and lower limit values to the voltage value and the electric current value at the output time of the electric power for driving, vehicle control can be realized at its maximum within a given condition by controlling motor torque in accordance with these limit values.

The invention is not limited to the aforementioned embodiments, and various modifications based on the purpose of the invention are possible, which are regarded as within the scope of the invention.

What is claimed is:

1. A vehicle, comprising:
    a motor that supplies a driving force to a wheel;
    a battery that supplies electric power to the motor and receives regenerative electric power from the motor; and
    a controller that:
        detects a deteriorating state of the battery; and
        sets, based on a detected deteriorating state of the battery, an upper limit value and a lower limit value for a voltage value or an electric current value that is output from the battery to the motor or is input from the motor to the battery.

2. The vehicle according to claim 1, wherein the controller:
    detects an outside air temperature or a battery temperature, and sets, based on the detected deteriorating state of the battery and a detected outside air temperature or battery temperature, the upper limit value and the lower limit value for the voltage value or the electric current value that is output from the battery to the motor or is input from the motor to the battery.

3. The vehicle according to claim 1, wherein a torque of the motor is controlled in accordance with the upper limit value and the lower limit value.

4. The vehicle according to claim 1, wherein the upper limit value and the lower limit value are changed for every control relating to driving the motor.

5. A vehicle, comprising:
a motor that supplies a driving force to a wheel;
a battery that supplies electric power to the motor and receives regenerative electric power from the motor; and
a controller that:
  detects an outside air temperature or a battery temperature; and
  sets, based on a detected outside air temperature or battery temperature, an upper limit value and a lower limit value for a voltage value or an electric current value that is output from the battery to the motor or is input from the motor to the battery.

6. The vehicle according to claim 5, wherein the upper limit value and the lower limit value are changed for every control relating to driving the motor.

7. A vehicle, comprising:
a motor that supplies a driving force to a wheel;
a battery that supplies electric power to the motor and receives regenerative electric power from the motor; and
a controller that changes an upper limit value and a lower limit value for a voltage value or an electric current value that is output from the battery to the motor and is input from the motor to the battery.

8. A method of operating a vehicle with a motor that supplies a driving force to a wheel and a battery that supplies electric power to the motor and receives regenerative electric power from the motor, comprising:

detecting a deteriorating state of the battery; and
setting, based on a detected deteriorating state of the battery, an upper limit value and a lower limit value for a voltage value or an electric current value that is output from the battery to the motor or is input from the motor to the battery.

9. The method according to claim 8, comprising:
detecting an outside air temperature or a battery temperature, and
setting, based on the detected deteriorating state of the battery and a detected outside air temperature or battery temperature, the upper limit value and the lower limit value for the voltage value or the electric current value that is output from the battery to the motor or is input from the motor to the battery.

10. The method according to claim 8, wherein a torque of the motor is controlled in accordance with the upper limit value and the lower limit value.

11. The method according to claim 8, wherein the upper limit value and the lower limit value are changed for every control relating to driving the motor.

12. A method of operating a vehicle with a motor that supplies a driving force to a wheel and a battery that supplies electric power to the motor and receives regenerative electric power from the motor, comprising:
detecting an outside air temperature or a battery temperature; and
setting, based on a detected outside air temperature or battery temperature, an upper limit value and a lower limit value for a voltage value or an electric current value that is output from the battery to the motor or is input from the motor to the battery.

13. The method according to claim 12, wherein the upper limit value and the lower limit value are changed for every control relating to driving the motor.

* * * * *